US012737529B2

(12) United States Patent
Huang et al.

(10) Patent No.: US 12,737,529 B2
(45) Date of Patent: Sep. 15, 2026

(54) TEXT CLASSIFICATION METHOD AND APPARATUS, TEXT PROCESSING METHOD AND APPARATUS, COMPUTER DEVICE AND STORAGE MEDIUM

(71) Applicant: Beijing Bytedance Network Technology Co., Ltd., Beijing (CN)

(72) Inventors: Junjian Huang, Beijing (CN); Guibo Pan, Beijing (CN); Yanhui Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 204 days.

(21) Appl. No.: 18/702,655

(22) PCT Filed: Dec. 22, 2022

(86) PCT No.: PCT/CN2022/141171
§ 371 (c)(1),
(2) Date: Apr. 18, 2024

(87) PCT Pub. No.: WO2023/142809
PCT Pub. Date: Aug. 3, 2023

(65) Prior Publication Data

US 2024/0419891 A1 Dec. 19, 2024

(30) Foreign Application Priority Data

Jan. 27, 2022 (CN) ......................... 202210102790.9

(51) Int. Cl.
*G06F 40/151* (2020.01)

(52) U.S. Cl.
CPC .................................. *G06F 40/151* (2020.01)

(58) Field of Classification Search
CPC ...... G06F 16/35; G06F 40/151; G06F 16/335; G06F 40/30; G06N 3/048; G06N 3/045; G06N 3/044; G06N 3/08
See application file for complete search history.

(56) References Cited

U.S. PATENT DOCUMENTS 9,715,495 B1 * 7/2017 Tacchi .................... G06F 40/30
11,023,675 B1 * 6/2021 Neervannan .......... G06F 16/954
(Continued)

FOREIGN PATENT DOCUMENTS

CN 104199857 B * 6/2017 ........... G06F 16/353
CN 109918653 A 6/2019
(Continued)

OTHER PUBLICATIONS

International Search Report and Written Opinion received for PCT Patent Application No. PCT/CN2022/141171, mailed on Jun. 1, 2023, 12 pages (2 pages of English Translation and 9 pages of Original Document).

*Primary Examiner* — Mohammad K Islam

(57) ABSTRACT

A text classification method and apparatus, a text processing method and apparatus, a computer device and a storage medium are provided. The text classification method which is applied to a server, includes: acquiring a topic text to be classified and tag description information of at least one topic tag to be predicted; extracting a target text feature of the topic text to be classified, and extracting a tag description feature of the tag description information of each topic tag to be predicted; determining a tag correlation between the target text feature and each tag description feature to obtain at least one tag correlation; and determining a target topic tag matching with the topic text to be classified from the at least one topic tag to be predicted based on the at least one tag correlation.

18 Claims, 8 Drawing Sheets

(56) References Cited

U.S. PATENT DOCUMENTS

| | | | | |
|---|---|---|---|---|
| 11,048,734 | B1 * | 6/2021 | Harris | G06F 16/3323 |
| 11,074,303 | B2 * | 7/2021 | Sabharwal | G06N 3/0464 |
| 2008/0104052 | A1 * | 5/2008 | Ryan | G06F 16/35 707/999.005 |
| 2014/0379719 | A1 * | 12/2014 | Wang | G06F 16/35 707/738 |
| 2015/0212976 | A1 * | 7/2015 | Chattopadhayay | G06F 16/35 704/9 |
| 2018/0174071 | A1 * | 6/2018 | Bhatt | G06F 18/2134 |
| 2019/0392035 | A1 * | 12/2019 | Indenbom | G06F 40/284 |
| 2020/0045122 | A1 | 2/2020 | Zhang | |
| 2020/0251100 | A1 * | 8/2020 | Tan | G06N 3/096 |
| 2020/0311207 | A1 * | 10/2020 | Kim | G06F 40/216 |
| 2021/0182912 | A1 * | 6/2021 | Misra | G06Q 30/0269 |
| 2021/0287130 | A1 * | 9/2021 | Kalluri | G06N 3/09 |
| 2022/0035867 | A1 * | 2/2022 | Tambi | G06F 40/263 |
| 2022/0171798 | A1 * | 6/2022 | Wang | G06N 7/01 |
| 2023/0289528 | A1 * | 9/2023 | Ma | G06F 40/289 |

FOREIGN PATENT DOCUMENTS

| | | | | | |
|---|---|---|---|---|---|
| CN | 110046231 | A | | 7/2019 | |
| CN | 113064964 | A | | 7/2021 | |
| CN | 113139051 | A | | 7/2021 | |
| CN | 113177121 | A | * | 7/2021 | G06N 3/044 |
| CN | 113626589 | A | | 11/2021 | |
| CN | 113627447 | A | | 11/2021 | |
| CN | 113778295 | A | | 12/2021 | |
| CN | 113821589 | A | | 12/2021 | |
| CN | 114443847 | A | | 5/2022 | |
| CN | 116860970 | A | * | 10/2023 | G06F 16/35 |
| KR | 20250138485 | A | * | 9/2025 | G06F 16/24578 |
| TW | 1828928 | B | * | 1/2024 | G06F 16/3344 |
| WO | WO-2024248731 | A1 | * | 12/2024 | G06N 3/08 |

* cited by examiner

First display unit 91

Receiving unit 92

Second acquisition unit 93

Second display unit 94

TEXT CLASSIFICATION METHOD AND APPARATUS, TEXT PROCESSING METHOD AND APPARATUS, COMPUTER DEVICE AND STORAGE MEDIUM

CROSS REFERENCE TO RELATED APPLICATIONS

The disclosure claims the priority of the Chinese patent application No. 202210102790.9, entitled "TEXT CLASSIFICATION METHOD AND APPARATUS, TEXT PROCESSING METHOD AND APPARATUS, COMPUTER DEVICE AND STORAGE MEDIUM", filed with China Patent Office on Jan. 27, 2022, which is herein incorporated by reference in its entirety.

TECHNICAL FIELD

The disclosure relates to the technical field of computers, in particular to a text classification method and apparatus, a text processing method and apparatus, a computer device and a storage medium.

BACKGROUND

When using book or article reading software, users often browse through book recommendation topics related to their interests, with the aim of finding favorite books or articles to read within those topics. However, this necessitates browsing through each individual book recommendation topic, resulting in reduced efficiency in locating desired books within different topics. Additionally, users can also search for their preferred books in the reading software. However, the contents retrieved by existing search solutions are book recommendation topics that match search keywords, and recommended books within these topics may not be relevant to books that are needed, or some book recommendation topics may be omitted from the retrieved contents, thereby resulting in users being unable to find satisfactory books and ultimately diminishing their reading experience on the reading software.

SUMMARY

Embodiments of the disclosure at least provide a text classification method and apparatus, a text processing method and apparatus, a computer device, a storage medium, a computer program product and a computer program.

In a first aspect, an embodiment of the disclosure provides a text classification method which is applied to a server and includes: acquiring a topic text to be classified and tag description information of at least one topic tag to be predicted; extracting a target text feature of the topic text to be classified, and extracting a tag description feature of the tag description information of each topic tag to be predicted; determining a tag correlation between the target text feature and each tag description feature to obtain at least one tag correlation; and determining a target topic tag matching with the topic text to be classified from the at least one topic tag to be predicted based on the at least one tag correlation.

In an alternative implementation, the target text feature includes a plurality of sub-text features, and each of the plurality of sub-text features corresponds to each first unit text in the topic text to be classified; and the determining the tag correlation between the target text feature and each tag description feature includes: determining a correlation coefficient of each first unit text based on the target text feature and the tag description feature, the correlation coefficient being used to represent a tag correlation degree between the first unit text and the corresponding topic tag to be predicted; and based on the correlation coefficient of each first unit text, performing weighted summation calculation on the sub-text features of respective the first unit texts, and determining the tag correlation according to a calculation result.

In an alternative implementation, the determining a correlation coefficient of each first unit text based on the target text feature and the tag description feature includes: determining a first sub-correlation coefficient of each first unit text based on a sub-text feature of each of the first unit texts; determining a second sub-correlation coefficient based on the target text feature and the tag description feature; and determining the correlation coefficient based on a ratio between the first sub-correlation coefficient and the second sub-correlation coefficient.

In an alternative implementation, the determining a first sub-correlation coefficient of each first unit text based on a sub-text feature of each of the first unit texts includes: determining a first weight of each first unit text based on the sub-text feature of each of the first unit texts and a preset weight matrix; and determining the first sub-correlation coefficient based on the first weight.

In an alternative implementation, the tag description feature includes a plurality of second unit texts, and the determining a second sub-correlation coefficient based on the target text feature and the tag description feature includes: determining a second weight of each first unit text based on the target text feature and a preset weight matrix; determining a third weight of each second unit text based on the tag description feature and the preset weight matrix; and determining the second sub-correlation coefficient based on the second weight and the third weight.

In an alternative implementation, the acquiring a topic text to be classified and tag description information of at least one topic tag to be predicted includes: acquiring original text data to be processed, and determining a text type identifier contained in the original text data; and determining a data partitioning position of the original text data based on the text type identifier, and partitioning the original text data based on the data partitioning position to obtain the topic text to be classified and the tag description information.

In an alternative implementation, the extracting a target text feature of the topic text to be classified includes: determining a target vector of each first unit text in the topic text to be classified, elements in the target vector being used for indicating a mapping relationship between the first unit text and each preset unit text; and extracting a key feature vector of the topic text to be classified from the target vectors of all the first unit texts in the topic text to be classified, and determining the key feature vector as the target text feature.

In an alternative implementation, the topic text to be classified includes at least one of the following: topic title text, topic summary text, and topic tag description text.

In an alternative implementation, the extracting a target text feature of the topic text to be classified, and the extracting a tag description feature of the tag description information of each topic tag to be predicted, include: extracting the target text feature of the topic text to be classified through a feature extraction layer in a text classification model, and extracting the tag description feature of the tag description information of each topic tag to be predicted; the determining a tag correlation between the target text feature and each tag description feature to obtain at least one tag correlation includes: determining the tag correlation between the target text feature and each tag description feature through a correlation determination layer in the text classification model to obtain the at least one tag correlation; and the determining a target topic tag matching with the topic text to be classified from the at least one topic tag to be predicted based on the at least one tag correlation includes: determining the target topic tag matching with the topic text to be classified from the at least one topic tag to be predicted based on the at least one tag correlation through a classification layer in the text classification model.

In an alternative implementation, the method further includes: determining a plurality of training samples, each of the plurality of training samples including a topic tag to be predicted and a topic text to be trained, each of the plurality of training samples including a matching tag, and the matching tag being used for indicating a matching degree between the topic tag to be predicted and the topic text to be trained; and training a text classification model to be trained through the plurality of training samples to obtain the text classification model.

In an alternative implementation, the training a text classification model to be trained through the plurality of training samples to obtain the text classification model includes: determining a first tag quantity of the topic tags to be predicted contained in the plurality of training samples, and determining a second tag quantity of target classification tags matching with the topic text to be trained in the topic tags to be predicted; determining a target loss function value of the text classification model to be trained based on the first tag quantity, the second tag quantity, the matching tags and prediction results of the text classification model to be trained on the plurality of training samples; and adjusting model parameters of the text classification model to be trained according to the target loss function value to obtain the text classification model.

In a second aspect, an embodiment of the disclosure further provides a text processing method which is applied to a terminal device and includes: displaying a topic text operation page; receiving target data input by a user on the operation page, the target data including a topic text to be published or topic tags of interest; acquiring a filtering result determined by a server based on the target data, the filtering result being obtained through the server filtering the data to be filtered, that is determined based on the target data, by using any of the text classification methods mentioned in the first aspect; and displaying the target data and/or the filtering result of the target data on the operation page.

In an alternative implementation, the target data include the topic text to be published; and the displaying the target data and/or the filtering result of the target data on the operation page includes: displaying the topic text to be published at a first display position of the operation page; and displaying a publishing type of the topic text to be published and/or at least one target topic tag matching with the topic text to be published at a second display position of the operation page.

In an alternative implementation, the method further includes: detecting a trigger operation of the user on a tag modification identifier of the target topic tag displayed on the operation page, performing a modification operation matching with the tag modification identifier triggered by the user on the target topic tag, and displaying a modified target topic tag on the operation page, the modification operation includes at least one of the following: adding, deleting and modifying.

In an alternative implementation, the target data include the topic tags of interest, and the method further includes: detecting whether a tag quantity of the topic tags of interest exceeds a preset number after receiving the topic tags of interest input by the user on the operation page; and displaying a prompt message when the tag quantity exceeds the preset number, the prompt message being used to indicate that the quantity of the topic tags of interest has reached the preset number.

In an alternative implementation, the target data include the topic tags of interest, and the displaying a topic text operation page includes: acquiring a preset topic tag belonging to at least one target topic category in response to a topic filtering request of the user; and determining a category display area of each target topic category on the operation page, and displaying a corresponding target topic category and a preset topic tag belonging to the target topic category in the category display area.

In an alternative implementation, the target data include the topic tags of interest; and the displaying the target data and/or the filtering result of the target data on the operation page includes: displaying the topic tags of interest in a title display area of the operation page; and displaying a key topic content of a published topic text matching with each topic tag of interest in a text display area of the operation page.

In an alternative implementation, the method further includes: determining a target topic tag selected by the user, and acquiring a published topic text matching with the target topic tag in response to a selection operation on the topic tags of interest; and displaying a key topic content of the published topic text matching with the target topic tag in a text display area of a topic filtering page.

In a third aspect, an embodiment of the disclosure further provides a text classification apparatus which is applied to a server and includes: a first acquisition unit configured to acquire a topic text to be classified and tag description information of at least one topic tag to be predicted; an extraction unit configured to extract a target text feature of the topic text to be classified, and extract a tag description feature of the tag description information of each topic tag to be predicted; a first determination unit configured to determine a tag correlation between the target text feature and each tag description feature to obtain at least one tag correlation; and a second determination unit configured to determine a target topic tag matching with the topic text to be classified from the at least one topic tag to be predicted based on the at least one tag correlation.

In a fourth aspect, an embodiment of the disclosure further provides a text processing apparatus which is applied to a terminal device and includes: a first display unit configured to display a topic text operation page; a receiving unit configured to receive target data input by a user on the operation page, the target data including a topic text to be published or topic tags of interest; a second acquisition unit configured to acquire a filtering result determined by a server based on the target data, the filtering result being obtained through the server filtering the data to be filtered, that is determined based on the target data, by using any of the text classification methods mentioned in the first aspect; and a second display unit configured to display the target data and/or the filtering result of the target data on the operation page.

In a fifth aspect, an embodiment of the disclosure further provides a computer device, including a processor, a memory and a bus, the memory stores machine-readable instructions executable by the processor; when the computer device runs, the processor communicates with the memory through the bus; and the machine-readable instructions, when executed by the processor, cause the processor to perform the steps in any one of the possible implementations in the first and second aspects described above.

In a sixth aspect, an embodiment of the disclosure further provides a computer-readable storage medium, a computer program is stored on the computer-readable storage medium, and the computer program, when executed by a processor, causes the processor to perform the steps in any one of the possible implementations in the first and second aspects described above.

In a seventh aspect, an embodiment of the disclosure further provides a computer program product, which includes a computer program stored in a readable storage medium, at least one processor of an electronic device can read the computer program from the readable storage medium, and the at least one processor executes the computer program to enable the electronic device to execute the steps in any one of the possible implementations in the first and second aspects described above.

In an eighth aspect, an embodiment of the disclosure further provides a computer program stored in a readable storage medium, at least one processor of an electronic device can read the computer program from the readable storage medium, and the at least one processor executes the computer program to enable the electronic device to execute the steps in any one of the possible implementations in the first and second aspects described above.

Embodiments of the disclosure provide a text classification method and apparatus, a text processing method and apparatus, a computer device, and a storage medium. In the embodiments of the disclosure, first, a topic text to be classified and tag description information of at least one corresponding topic tag to be predicted can be acquired, and a target text feature of the topic text to be classified and a tag description feature of the tag description information of each topic tag to be predicted are extracted; then, a tag correlation between the target text feature and each tag description feature can be determined; and finally, a target topic tag matching with the topic text to be classified can be determined from the at least one topic tag to be predicted based on the tag correlation.

In the above implementation, the target topic tag is determined from the topic tags to be predicted by determining the tag correlation between the tag description feature and the target text feature, so that the corresponding topic tag can be more accurately determined for the topic text to be classified, thereby improving the accuracy of topic classification for the topic text to be classified. Under the condition that the topic text to be classified is a book recommendation topic, a topic tag of the book recommendation topic can be determined more accurately by means of the above processing method, and the accuracy of classification for the book recommendation topic can be improved, so as to provide users with more accurate book recommendations, thereby improving their reading experience.

In order to make the above objects, features and advantages of the disclosure clearer and comprehensible, the following detailed description is provided, illustrating exemplary embodiments and accompanied by the attached drawings.

BRIEF DESCRIPTION OF THE DRAWINGS

In order to explain the technical schemes of embodiments of the disclosure more clearly, the accompanying drawings to be used in the illustration of the embodiments are briefly described below. The accompanying drawings, which are incorporated in and constitute a part of this specification, illustrate embodiments consistent with the disclosure and together with the specification, serve to explain the technical schemes of the disclosure. It should be understood that the following accompanying drawings only show some embodiments of the disclosure and therefore should not be construed as a limitation on the scope of the disclosure. For those of ordinary skill in the art, other relevant drawings can be derived on the basis of these drawings without any inventive effort.

DETAILED DESCRIPTION

Figure 1:
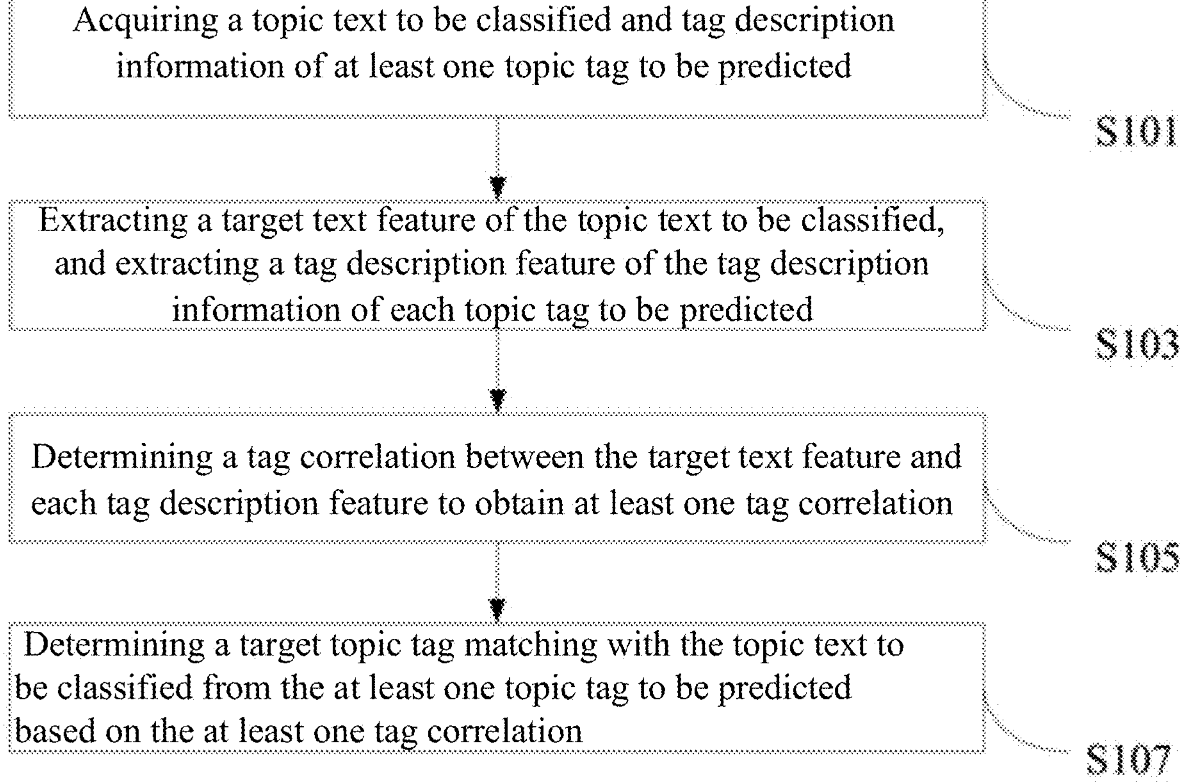
FIG. 1 is a flowchart of a text classification method provided by an embodiment of the disclosure.

In order to make the purpose, technical scheme and advantages of the embodiments of the disclosure clearer, the technical scheme in the embodiments of the disclosure will be described clearly and completely with reference to the attached drawings. Obviously, the described embodiments are only part of the embodiments of the disclosure, not all of them. The components in the embodiments of the disclosure generally described and illustrated in the drawings herein may be arranged and designed in various different configurations. Therefore, the following detailed description of the embodiments of the disclosure provided in the accompanying drawings is not intended to limit the scope of the claimed disclosure, but merely represents selected embodiments of the disclosure. Based on the embodiments of the disclosure, all other embodiments obtained by those skilled in the art without any creative work belong to the scope of protection of the disclosure.

It should be noted that similar reference numerals and letters indicate similar items in the following figures, so once an item is defined in one figure, it will not be further defined and explained in subsequent figures.

The term "and/or" herein only describes an associative relationship, which means that there can be three kinds of relationships, for example, A and/or B can mean A alone; A and B; and B alone. In addition, the term "at least one" herein means any one of multiple options or any combination of at least two options among multiple options. For example, having at least one of A, B, or C can indicate selecting any one or more elements from the set consisting of A, B, and C.

It is found through research that when using book or article reading software, users often browse through book recommendation topics related to their interests, with the aim of finding favorite books or articles to read within those topics. However, this necessitates browsing through each individual book recommendation topic, resulting in reduced efficiency in locating desired books within different topics. Additionally, users can also search for their preferred books in the reading software. However, the contents retrieved by existing search solutions are book recommendation topics that match search keywords, and recommended books within these topics may not be relevant to books that are needed, or some book recommendation topics may be omitted from the retrieved contents, thereby resulting in users being unable to find satisfactory books and ultimately diminishing their reading experience on the reading software.

Based on the above research, the disclosure provides a text classification method and apparatus, a text processing method and apparatus, a computer device, and a storage medium. In the embodiments of the disclosure, first, a topic text to be classified and tag description information of at least one corresponding topic tag to be predicted can be acquired, and a target text feature of the topic text to be classified and a tag description feature of the tag description information of each topic tag to be predicted are extracted; then, a tag correlation between the target text feature and each tag description feature can be determined; and finally, a target topic tag matching with the topic text to be classified can be determined from the at least one topic tag to be predicted based on the tag correlation.

In the above implementation, the target topic tag is determined from the topic tags to be predicted by determining the tag correlation between the tag description feature and the target text feature, so that the corresponding topic tag can be more accurately determined for the topic text to be classified, thereby improving the accuracy of topic classification for the topic text to be classified. Under the condition that the topic text to be classified is a book recommendation topic, a topic tag of the book recommendation topic can be determined more accurately by means of the above processing method, and the accuracy of classification for the book recommendation topic can be improved, so as to provide users with more accurate book recommendations, thereby improving their reading experience.

To facilitate the understanding of the embodiments, firstly, a text classification method and a text processing method disclosed in the embodiments of the disclosure are introduced in detail. The executive subject of the text classification method and text processing method provided in the embodiments of the disclosure is generally a computer device with certain computing power, which includes, for example, a terminal device or a server or other processing devices. In some possible implementations, the text classification method and text processing method can be realized by a processor invoking computer-readable instructions stored in a memory.

Referring to FIG. 1 which is a flowchart of a text classification method provided by an embodiment of the disclosure, the method is applied to a server and includes steps S101-S107.

In S101, a topic text to be classified and tag description information of at least one topic tag to be predicted are acquired.

The text classification method provided by the embodiment of the disclosure can be applied to a server of book or article reading software. For example, when using the reading software, users can get the books and articles they want to read by publishing a post, or communicate with other users by publishing a post.

In the embodiment of the disclosure, the topic text to be classified may be a text edited by a current user through the reading software, or a text edited by other users through the reading software. For example, the topic text to be classified can be the post content input by users through the reading software.

After acquiring the topic text to be classified input by the user, the tag description information of at least one topic tag to be predicted can be determined for the topic text to be classified.

In practice, a plurality of topic tags can be preset (i.e., preset topic tags); and then, all the preset topic tags can be determined as the at least one topic tag to be predicted. In addition, the preset topic tags can be preliminarily filtered to obtain at least one topic tag to be predicted. The specific filtering principle can be as follows: determining topic tags from the preset topic tags that include feature information of the topic text to be classified as the at least one topic tag to be predicted. In this case, the at least one topic tag to be predicted can include the feature information corresponding to the topic text to be classified.

For example, in a case where the topic text to be classified is "Looking for high-quality romance novels", the feature information corresponding to the topic text to be classified can be "romance" and "novels". In this case, at least one topic tag to be predicted corresponding to the topic text to be classified can include "romance" and/or "novels".

In the embodiment of the disclosure, each topic tag to be predicted can also include tag description information for annotating the topic tag to be predicted. For example, when the topic tag to be predicted is "sports", the tag description information corresponding to the topic tag to be predicted can include terms such as "sports", "athletics", "boxing", "competition", "basketball" and "football".

In S103, a target text feature of the topic text to be classified is extracted, and a tag description feature of the tag description information of each topic tag to be predicted is extracted.

In the embodiment of the disclosure, after acquiring the topic text to be classified and the tag description information of the at least one topic tag to be predicted, feature extraction can be performed on the topic text to be classified through a feature extraction layer in a text classification model to obtain a corresponding target text feature, and feature extraction can be performed on each piece of tag description information to obtain a corresponding tag description feature. The data formats of the extracted target text feature and tag description feature can be vectors, for example, text representation vector and tag representation vector. After the text representation vector and the tag representation vector are obtained, a tag correlation can be determined based on the text representation vector and the tag representation vector, and the method of determining the tag correlation through vector data can simplify the process of analyzing the correlation between the target text feature and the tag description feature.

In the embodiment of the disclosure, the text classification model includes an input layer, an embedding layer and a feature extraction layer, and the input layer, the embedding layer and the feature extraction layer are connected in series.

In practice, after acquiring the topic text to be classified and the tag description information, the input layer can convert the topic text to be classified and a text in the tag description information into one-hot codes. The embedding layer can convert the one-hot code corresponding to the topic text to be classified and the one-hot code corresponding to the tag description feature into word vectors. After acquiring the above-mentioned word vectors, the feature extraction layer can perform vector extraction on the word vectors to obtain the target text feature of the topic text to be classified and the tag description feature of the tag description information.

In S105, a tag correlation between the target text feature and each tag description feature is determined to obtain at least one tag correlation.

In the embodiment of the disclosure, the tag correlation between the target text feature and each tag description feature can be calculated through correlation calculation. In practice, the target text feature and the tag description feature can be fused by a fusion layer in the text classification model, so as to determine the tag correlation between the target text feature and the tag description feature according to a fusion result. An input of the fusion layer is connected with an output of the feature extraction layer of the text classification model.

Here, the tag correlation can be expressed as a correlation representation vector. The correlation representation vector is used to represent the tag correlation between the topic text to be classified and the corresponding topic tag to be predicted. After being acquired, the correlation representation vector can be normalized to obtain a numerical value within the range of 0 to 1. The numerical value is used for representing a correlation probability between the topic text to be classified and the corresponding topic tag to be predicted.

In practice, the correlation representation vector can be input to a dichotomy layer in the text classification model for mapping, so that the correlation representation vector can be mapped to a numerical value within the range of 0 to 1. The dichotomy layer includes a fully connected layer and a Sigmod layer, and the fully connected layer and the Sigmod layer are connected in turn. Here, the correlation representation vector can be processed in turn through the fully connected layer and the Sigmod layer, so as to obtain a normalized correlation probability. Here, an input of the dichotomy layer in the text classification model is connected with an output of the fusion layer.

In S107, a target topic tag matching with the topic text to be classified is determined from the at least one topic tag to be predicted based on the at least one tag correlation.

From the above description, it can be seen that for the topic tags to be predicted, the topic text to be classified and each topic tag to be predicted can determine a corresponding correlation representation vector. At this point, each correlation representation vector can be normalized to obtain at least one correlation probability. The correlation probability can be a probability value of 0 to 1. Here, each correlation probability is used to represent the degree of correlation (or similarity) between the topic text to be classified and the corresponding topic tag to be predicted.

Here, after obtaining at least one correlation probability, the at least one correlation probability can be filtered to determine a correlation probability that meets the probability requirement. Specifically, the probability requirement can be understood as being greater than or equal to a preset probability threshold. In this case, a correlation probability greater than or equal to the preset probability threshold can be determined as the correlation probability that meets the probability requirement.

After determining the correlation probability that meets the probability requirement, a topic tag to be predicted corresponding to the correlation probability that meets the probability requirement can be determined, and the corresponding topic tag to be predicted can be determined as the target topic tag.

In the embodiment of the disclosure, the target topic tag is determined from the topic tags to be predicted by determining the tag correlation between the tag description feature and the target text feature, so that the corresponding topic tag can be more accurately determined for the topic text to be classified, thereby improving the accuracy of topic classification for the topic text to be classified. Under the condition that the topic text to be classified is a book recommendation topic, a topic tag of the book recommendation topic can be determined more accurately by means of the above processing method, and the accuracy of classification for the book recommendation topic can be improved, so as to provide users with more accurate book recommendations, thereby improving their reading experience.

In an alternative implementation, the step S101 of acquiring a topic text to be classified and tag description information of at least one topic tag to be predicted specifically includes: (1) acquiring original text data to be processed, and determining a text type identifier contained in the original text data; and (2) determining a data partitioning position of the original text data based on the text type identifier, and partitioning the original text data based on the data partitioning position to obtain the topic text to be classified and the tag description information.

In the embodiment of the disclosure, the original text data to be processed can be composed of multiple parts, for example, the original text data to be processed may include the topic text to be classified and the tag description information of the at least one topic tag to be predicted. Here, each part of the original text data can correspond to different text type identifiers.

The original text data include a plurality of text blocks, and each text block includes a corresponding data identifier bit segment ID, the data identifier bit segment ID is used to indicate the text type identifier of the corresponding text block. In practice, the data identifier bit segment ID of each text block in the original text data can be identified separately to obtain the text type identifier indicated by the data identifier bit segment ID.

Here, in the original text data, an identity value of a text type identifier indicated by the data identifier bit segment ID of a text block to which the topic text to be classified belongs can be set to 0, and a value of a text type identifier indicated by the data identifier bit segment ID of a text block to which the tag description information belongs can be set to 1.

In the embodiment of the disclosure, a data partitioning position of the original text data can be determined based on the identity value of the text type identifier, and the original text data can be partitioned based on the data partitioning position.

Figure 2:
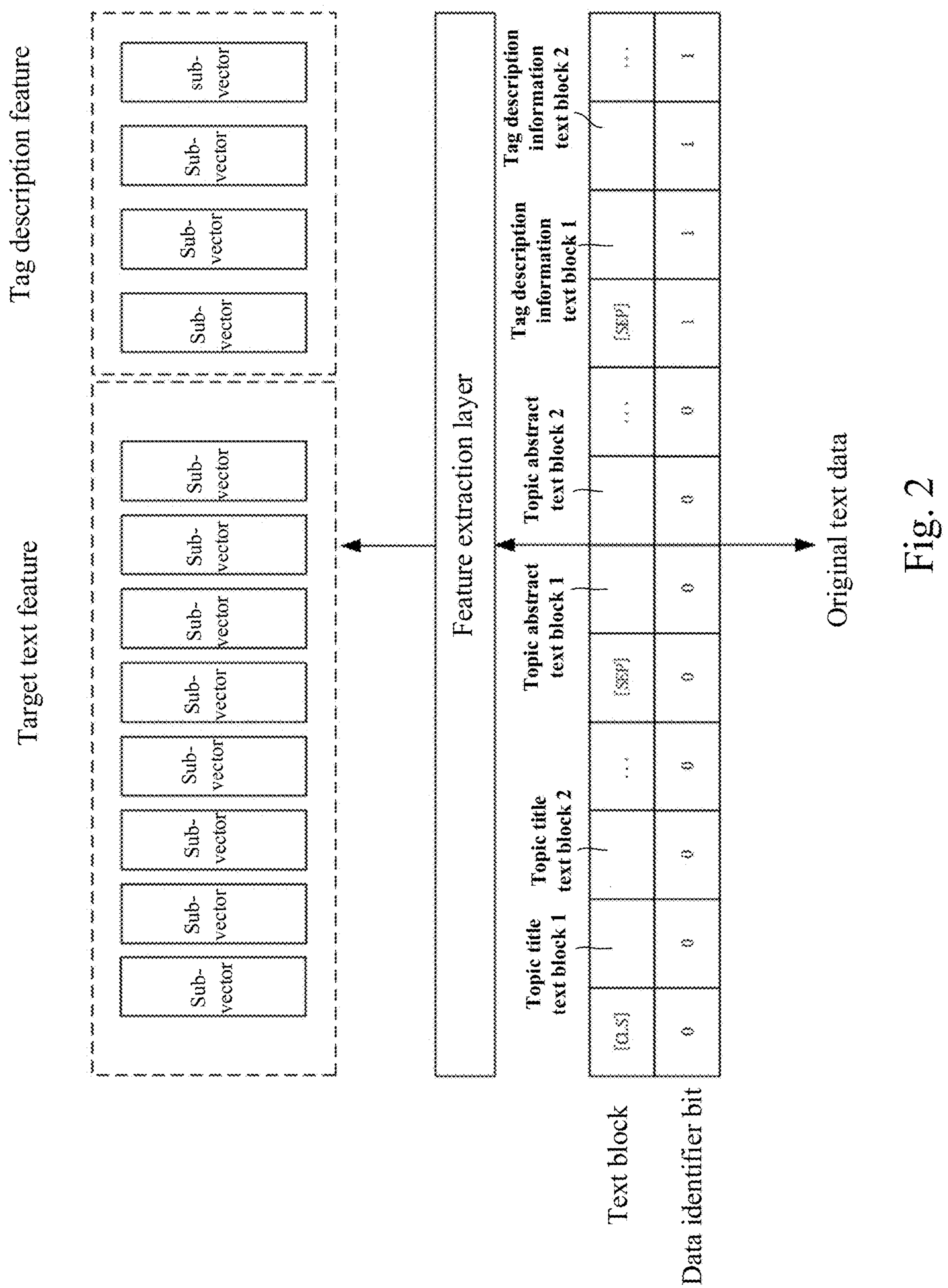
FIG. 2 is a diagram of partitioning original text data based on a data partitioning position provided by an embodiment of the disclosure.

Specifically, as shown in FIG. 2, during partitioning, the original text data can be partitioned according to the text type identifier, so as to obtain the topic text to be classified and the tag description information.

Here, a first separator [SEP] can be inserted into the original text data according to the identity value of the text type identifier, and the original text data can be partitioned based on the first separator. In practice, when it is detected that the identity values of any two consecutive text type identifiers are different, the first separator [SEP] is inserted between the two consecutive text type identifiers, and then the original text data are partitioned by the first separator [SEP].

Here, it is also possible to insert a second separator between different types of text blocks of the topic text to be classified in advance, and further partition the topic text to be classified by the second separator. Specifically, the original text data include the topic text to be classified and the tag description information (also referred to as description). The topic text to be classified includes at least one of the following: topic title text (also referred to as title) and topic abstract text (also referred to as abstract). The topic title text can be a title of the topic text to be classified, and the topic abstract text can be the content introduction of the topic text to be classified. In this case, the different types of text blocks of the topic text to be classified can be understood as: text blocks belonging to the topic title text and text blocks belonging to topic abstract text.

From the above description, it can be seen that the original text data can be divided into different text blocks (each text block can be marked as a token), making it easier for a BERT model (Bidirectional Encoder Representations from Transformers model, i.e., the feature extraction layer) to process the original text data. The BERT model can perform feature extraction on the original text data, so as to obtain the target text feature corresponding to the topic text to be classified and the tag description feature corresponding to the target text feature.

Here, the target text feature can be denoted as a topix vector, and the tag description feature can be denoted as a description vector. As shown in FIG. 2, the target text feature and the tag description feature are each composed of their own sub-vectors.

From the above description, it can be seen that by partitioning the original text data to be processed according to the text type identifier to obtain the topic text to be classified and the tag description information, the target text feature of the topic text to be classified and the tag description feature of the topic tags to be predicted can be quickly divided, thus improving the efficiency of determining the tag correlation between the topic text to be classified and the topic tag to be predicted.

In an alternative implementation, the step S103 of extracting a target text feature of the topic text to be classified specifically includes: (1) determining a target vector of each first unit text in the topic text to be classified, elements in the target vector being used for indicating a mapping relationship between the first unit text and each preset unit text; and (2) extracting a key feature vector of the topic text to be classified from the target vectors of all the first unit texts in the topic text to be classified, and determining the key feature vector as the target text feature.

In the embodiment of the disclosure, firstly, the topic text to be classified can be divided to obtain a plurality of first unit texts. A length of a target vector corresponding to each first unit text can be determined by a text length of the first unit text, and the text lengths of the plurality of first unit texts of the topic text to be classified can be different. For example, the text length of the first unit text can be classified into four types: characters, words, sentences, and paragraphs.

Here, the preset unit text can be a preset text for filtering the first unit texts, and there may be multiple preset unit texts. When filtering the first unit texts by using the preset unit text, the target vector corresponding to each first unit text can be determined first, and a mapping relationship between the target vector and each preset unit text can be determined.

In the embodiment of the disclosure, after the mapping relationship is determined, based on the mapping relationship, a sub-vector (that is, the sub-vector of the target text feature in FIG. 2) matching with the preset unit text in the target vector can be determined as the key feature vector, and then the target text feature can be determined according to the key feature vector.

For example, assuming that the preset unit text is "science fiction", the first unit text corresponding to the sub-vector matching with the preset unit text determined from the target vector can also be "science fiction". Alternatively, the sub-vector in the target vector and the preset unit text may not be completely matched. For example, when the first unit text is "science and technology", the matching degree between the sub-vector corresponding to the first unit text and the preset unit text is high. In this case, the text feature corresponding to the first unit text "science and technology" can still be determined as the target text feature.

From the above description, it can be seen that the key feature vector in the target vector can be extracted, and irrelevant contents can be filtered out, thus reducing the computational load and improving the efficiency of determining the target text feature.

In an alternative implementation, under the condition that the target text feature includes a plurality of sub-text features, and each sub-text feature corresponds to each first unit text in the topic text to be classified, the step S105 of determining the tag correlation between the target text feature and each tag description feature specifically includes: (1) determining a correlation coefficient of each first unit text based on the target text feature and the tag description feature, the correlation coefficient being used to represent a tag correlation degree between the first unit text and the corresponding topic tag to be predicted; and (2) based on the correlation coefficient of each first unit text, performing weighted summation calculation on the sub-text features of respective the first unit texts, and determining the tag correlation according to a calculation result.

In the embodiment of the disclosure, firstly, the target text feature and the tag description feature can be fused according to a fusion weight of a sub-text feature of each first unit text in the target text feature, so as to obtain the tag correlation.

In practice, a correlation coefficient of each first unit text in the topic text to be classified can be determined first, the correlation coefficient is used to represent a tag correlation degree between each first unit text and the corresponding topic tag to be predicted.

Specifically, taking the sub-text feature $X_i$ of an $i^{th}$ first unit text in the topic text to be classified as an example, the correlation coefficient of the $i^{th}$ first unit text can be determined. For example, the correlation coefficient of the first unit text can be denoted as $$\frac{e^{w_i}}{\sum_j e^{w_j}},$$

where $$w_i = X_i^T D,$$

and D is a weight extraction matrix learned from the training process of the text classification model.

After determining the correlation coefficient of each first unit text, weighted summation calculation can be performed on the sub-text features of respective the first unit texts based on the correlation coefficients, so as to obtain the tag correlation.

In practice, after multiplying the correlation coefficient with the corresponding sub-text feature, the products of all the first unit texts are summed, so as to obtain the tag correlation. The tag correlation can be denoted as R, and the process of weighted summation calculation based on the correlation coefficient and the sub-text feature of each first unit text can be denoted as:

$$R = \sum_i \frac{e^{w_i}}{\sum_j e^{w_j}} X_i.$$

From the above description, it can be seen that the accuracy of the tag correlation can be improved by calculating the correlation coefficient of each first unit text in the target text feature and the tag description feature and performing weighted summation calculation on the correlation coefficients to obtain the tag correlation.

In an alternative implementation, the determining a correlation coefficient of each first unit text based on the target text feature and the tag description feature specifically includes: (1) determining a first sub-correlation coefficient of each first unit text based on a sub-text feature of the first unit text; (2) determining a second sub-correlation coefficient based on the target text feature and the tag description feature; and (3) determining the correlation coefficient based on a ratio between the first sub-correlation coefficient and the second sub-correlation coefficient.

In the embodiment of the disclosure, firstly, a transposition result $$X_i^T$$

of the sub-text feature of the $i^{th}$ first unit text can be determined, where T means transposing the sub-text feature $X_i$ of the first unit text. After determining the transposition result of the sub-text feature of the first unit text, the first sub-correlation coefficient $e^{w_i}$ can be determined based on the transposition result, where $$w_i = X_i^T D,$$

and D is a weight extraction matrix (i.e., the following preset weight matrix) learned from the training process of the text classification model.

Then, the second sub-correlation coefficient can be determined. In practice, the second sub-correlation coefficient $\Sigma_j e^{w_j}$ can be determined based on the target text feature and the tag description feature, where j=i+k, i represents the number of the first unit texts, and k represents the number of the second unit texts in the tag description information. Further, $$w_j = X_j^T D, \text{ and } X_j^T$$

represents a sub-text feature of the target text feature and a sub-text feature of the tag description feature.

In the embodiment of the disclosure, after determining the first sub-correlation coefficient and the second sub-correlation coefficient, the correlation coefficient of each first unit text can be determined based on the ratio between the first sub-correlation coefficient and the second sub-correlation coefficient.

From the above description, it can be seen that the accuracy of the tag correlation can be improved by determining the correlation coefficient through the first sub-correlation coefficient and the second sub-correlation coefficient.

In an alternative implementation, the determining a first sub-correlation coefficient of each first unit text based on a sub-text feature of the first unit text specifically includes: (1) determining a first weight of each first unit text based on the sub-text feature of the first unit text and a preset weight matrix; and (2) determining the first sub-correlation coefficient based on the first weight.

In the embodiment of the disclosure, firstly, the first weight $w_i$ of the first unit text can be determined, the first weight $w_i$ can be used to represent a fusion weight of the sub-text feature of the first unit text in the target text feature. After calculating the first weight $w_i$, the first sub-correlation coefficient can be determined based on the first weight.

In practice, the preset weight matrix D can be obtained, and then the first weight $w_i$ of each first unit text can be determined according to the formula $$w_i = X_i^T D.$$

In the embodiment of the disclosure, after the first weight is determined, the first sub-correlation coefficient $e^{w_i}$ corresponding to the first unit text can be determined based on the first weight.

From the above description, it can be seen that the accuracy of the correlation coefficient is improved by determining the first weight of each first unit text in the target text feature and then determining the first sub-correlation coefficient of each first unit text.

In an alternative implementation, under the condition that the tag description feature includes a plurality of second unit texts, the determining a second sub-correlation coefficient based on the target text feature and the tag description feature specifically includes: (1) determining a second weight of each first unit text based on the target text feature and a preset weight matrix; (2) determining a third weight of each second unit text based on the tag description feature and the preset weight matrix; and (3) determining the second sub-correlation coefficient based on the second weight and the third weight.

In the embodiment of the disclosure, firstly, the second weight can be determined based on the sub-text feature in the target text feature and the preset weight matrix D. Specifically, the second weight can be determined according to the formula $$w_i = X_i^T D.$$

Then, the third weight can be determined based on the tag description feature and the preset weight matrix. Specifically, the third weight can be determined according to the formula $$w_j = X_j^T D.$$

After determining the second weight and the third weight, the second sub-correlation coefficient $\Sigma_j e^{w_j}$ can be determined based on the second weight and the third weight.

In practice, if the number of the first unit texts is i, the number of the second unit texts is k, and i+k=j, then the second sub-correlation coefficient can be expressed as a summation operation of $e^{w_i}$ determined based on the second weight of each first unit text and $e^{w_j}$ determined based on the third weight of each second unit text, so as to obtain $\Sigma_j e^{w_j}$.

From the above description, it can be seen that the accuracy of the correlation coefficient can be improved by determining the second weight and the third weight and then determining the second sub-correlation coefficient according to the second weight and the third weight.

In an alternative implementation, based on the embodiment shown in FIG. 1, the step S103 of, extracting a target text feature of the topic text to be classified, and extracting a tag description feature of the tag description information of each topic tag to be predicted, includes: extracting the target text feature of the topic text to be classified through a feature extraction layer in a text classification model, and extracting the tag description feature of the tag description information of each topic tag to be predicted.

Figure 3:
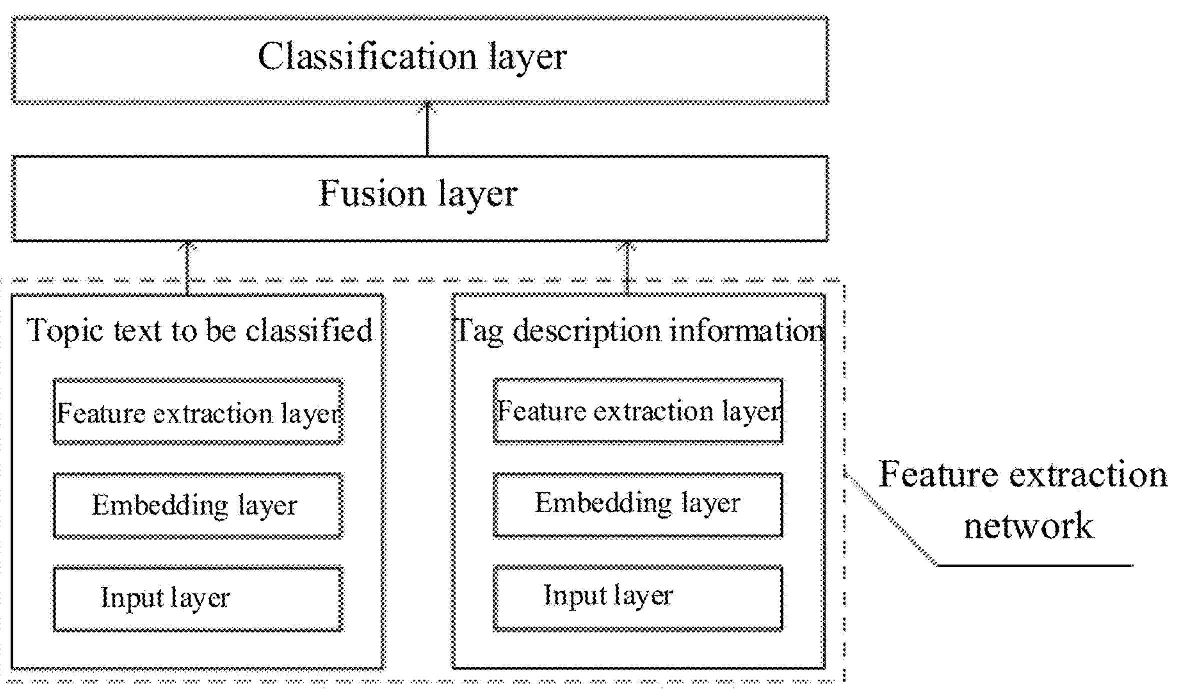
FIG. 3 is a frame diagram of a text classification model corresponding to a text classification method provided by an embodiment of the disclosure.

In the embodiment of the disclosure, as shown in FIG. 3 which is a frame diagram of a text classification model corresponding to a text classification method provided by an embodiment of the disclosure, the text classification model includes a feature extraction network, a fusion layer and a classification layer (i.e., a dichotomy layer), the feature extraction network includes an input layer, an embedding layer and a feature extraction layer.

In the embodiment of the disclosure, firstly, the target text feature of the topic text to be classified and the tag description feature of the tag description information need to be extracted through the feature extraction network. As shown in FIG. 3, the feature extraction network includes an input layer, an embedding layer and a feature extraction layer.

Taking the topic text to be classified as an example, the process of extracting the target text feature by the feature extraction network is as follows.

(1) Input layer: after the topic text to be classified is acquired, the topic text to be classified is input into the input layer for processing; then the input layer can convert the topic text to be classified into a one-hot code. After converting the topic text to be classified into the one-hot code, each unit text in the topic text to be classified can be converted into a fixed-dimensional vector composed of 0 and 1.

(2) Embedding layer: after the one-hot code of the topic text to be classified is acquired, the one-hot code can be converted into a word vector corresponding to the topic text to be classified, and a one-hot code of the tag description information can be converted into a word vector corresponding to the tag description information. Here, the one-hot code can be converted into the corresponding word vector by a word2vec model.

(3) Feature extraction layer: after the word vector corresponding to the topic text to be classified and the word vector corresponding to the tag description information are acquired, feature extraction can be performed on the word vector, so as to obtain a text representation vector for representing the expressed content of the topic text to be classified and a tag representation vector corresponding to the tag description information.

It should be understood that the feature extraction layer can perform feature extraction according to the semantics of the word vector, so that the obtained text representation vector is coherent and can accurately express the content of the topic text to be classified. Here, the feature extraction layer can extract the text representation vector through a CNN model (Convolutional Neural Networks) or an RNN model (Recurrent Neural Networks).

It should be noted that the extraction process of the tag representation vector of the tag description information is the same as the extraction process of the text representation vector, which is not repeated here.

In an alternative implementation, based on the embodiment shown in FIG. 1, the step S105 of determining a tag correlation between the target text feature and each tag description feature to obtain at least one tag correlation includes: determining the tag correlation between the target text feature and each tag description feature through a correlation determination layer in the text classification model to obtain the at least one tag correlation.

In the embodiment of the disclosure, as shown in FIG. 3, the target text feature and the tag description feature can be fused by a fusion layer (i.e., the correlation determination layer), so as to obtain the tag correlation between the target text feature and the tag description feature.

Here, the target text feature can be divided into sub-text features of respective first unit texts, and then the correlation between the sub-text feature of each first unit text and the tag description feature can be calculated, so that the tag correlation between the target text feature and the tag description feature can be determined according to the correlation between the sub-text features of all the first unit texts and the tag description feature.

Specifically, the fusion layer can first calculate the first weight $w_i$ according to the formula $$w_i = X_i^T D.$$

Then, based on the first weight $w_i$, the correlation R between the first unit text and the target text feature can be calculated, where $$R = \sum_i \frac{e^{w_i}}{\sum_j e^{w_j}} X_i.$$

It should be noted that when there are a plurality of topic tags to be predicted, a tag correlation exists between the topic text to be classified and the tag description information of each topic tag to be predicted.

In an alternative implementation, based on the embodiment shown in FIG. 1, the step S107 of determining a target topic tag matching with the topic text to be classified from the at least one topic tag to be predicted based on the at least one tag correlation includes: determining the target topic tag matching with the topic text to be classified from the at least one topic tag to be predicted based on the at least one tag correlation through a classification layer in the text classification model.

In the embodiment of the disclosure, the classification layer may be composed of a fully connected layer and a normalization layer, the fully connected layer may include a matrix W. Specifically, after acquiring the tag correlation, the classification layer can map a vector of the tag correlation into a correlation probability through the fully connected layer and the normalization layer. Here, the correlation probability is used to represent the degree of correlation between the topic tag to be predicted and the topic text to be classified.

Here, the specific mapping process is as follows: logit=sigmoid($R^T W$).

The expression form of logit can be a percentage probability value, for example, 60%, R is the tag correlation between the tag description feature and the target text feature, sigmoid is a normalized function, and sigmoid is calculated as follows:

$$\text{sigmoid}(x) = \frac{1}{1+e^{-x}}.$$

From the above description, it can be seen that the target topic tag is determined from the topic tags to be predicted by determining the tag correlation between the tag description feature and the target text feature, so that the corresponding topic tag can be more accurately determined for the topic text to be classified, thereby improving the accuracy of topic classification for the topic text to be classified. Under the condition that the topic text to be classified is a book recommendation topic, a topic tag of the book recommendation topic can be determined more accurately by means of the above processing method, and the accuracy of classification for the book recommendation topic can be improved, so as to provide users with more accurate book recommendations, thereby improving their reading experience.

In an alternative implementation, the method further includes a process of training the text classification model to be trained, which specifically includes the following steps: (1) determining a plurality of training samples, each training sample including a topic tag to be predicted and a topic text to be trained, each training sample including a matching tag, and the matching tag being used for indicating a matching degree between the topic tag to be predicted and the topic text to be trained; and (2) training a text classification model to be trained through the plurality of training samples to obtain the text classification model.

In the embodiment of the disclosure, firstly, a plurality of training samples including the topic tag to be predicted and the topic text to be trained can be determined, each training sample includes a topic text to be trained and at least one topic tag to be predicted, and each topic tag to be predicted corresponds to a matching tag, which is used to represent the matching degree between the topic tag to be predicted and the topic text to be classified.

Here, when the matching tag is "1", it means that the topic tag to be predicted matches with the topic text to be trained; and when the matching tag is "0", it means that the topic tag to be predicted and the topic text to be trained do not match.

In the embodiment of the disclosure, the training a text classification model to be trained through the plurality of training samples to obtain the text classification model specifically includes: (1) determining a first tag quantity of the topic tags to be predicted contained in the plurality of training samples, and determining a second tag quantity of target classification tags matching with the topic text to be trained in the topic tags to be predicted; (2) determining a target loss function value of the text classification model to be trained based on the first tag quantity, the second tag quantity, the matching tags and prediction results of the text classification model to be trained on the plurality of training samples; and (3) adjusting model parameters of the text classification model to be trained according to the target loss function value to obtain the text classification model.

In the embodiment of the disclosure, a target loss function (denoted as loss) of the text classification model to be trained needs to be determined first. Specifically, the calculation process of the target loss function is as follows:

$$\text{loss} = -\frac{N_{tags}-\sigma}{1+N_{tags}} y_{true}\log y_{pred} - \frac{1+\sigma}{1+N_{tags}}(1-y_{true})\log(1-y_{pred}).$$

where $N_{tags}$ is the first tag quantity of the topic tags to be predicted contained in the plurality of training samples, and $y_{true}$ is a symbolic function, that is, the matching tag mentioned above. When the topic tag to be predicted matches with the topic text to be trained, $y_{true}=1$; and when the topic tag to be predicted does not match with the topic text to be trained, $y_{true}=0$. The second tag quantity can be determined according to the symbolic function. $y_{pred}$ is a predicted value of a correlation probability output by the text classification model to be trained for the topic tag to be predicted (i.e., the prediction result of the text classification model to be trained on the plurality of training samples). σ is a superparameter, which is generally an average of the first tag quantities of all the training samples.

From the above description, it can be seen that the target loss function value of the text classification model to be trained can be determined based on the first tag quantity, the second tag quantity, the matching tags and prediction results of the text classification model to be trained on the plurality of training samples, and model parameters of the text classification model to be trained can be adjusted according to the target loss function value, so as to improve the prediction accuracy of the text classification model.

Figure 4:
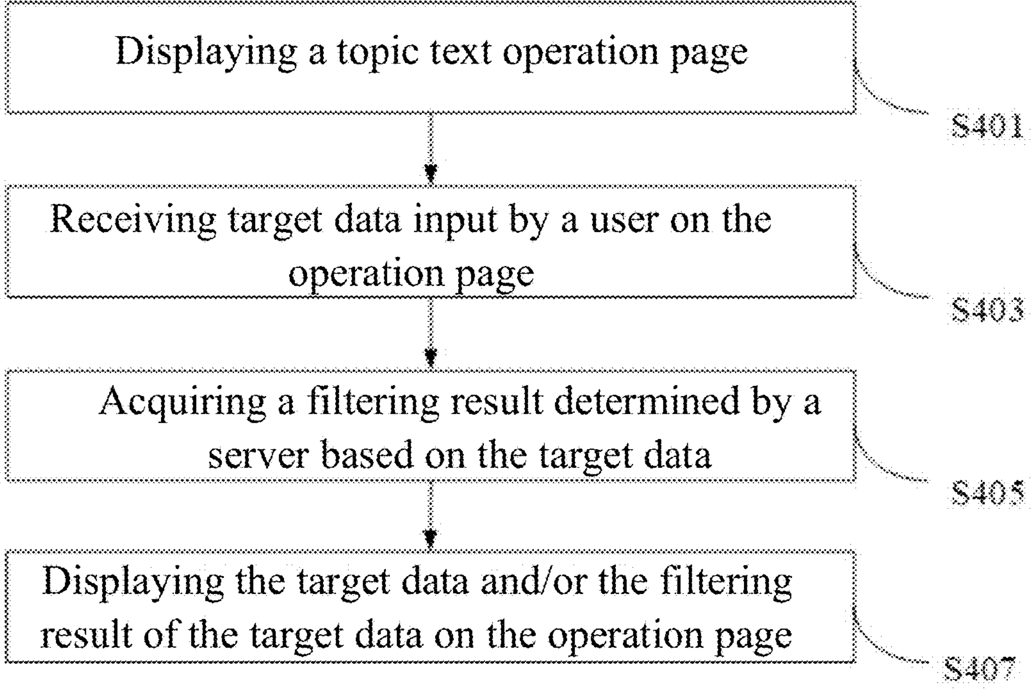
FIG. 4 is a flowchart of a text processing method provided by an embodiment of the disclosure.

Referring to FIG. 4 which is a flowchart of a text processing method provided by an embodiment of the disclosure, the method is applied to a terminal device in which reading software is pre-installed and includes steps S401-S407.

In S401, a topic text operation page is displayed.

Figure 5:
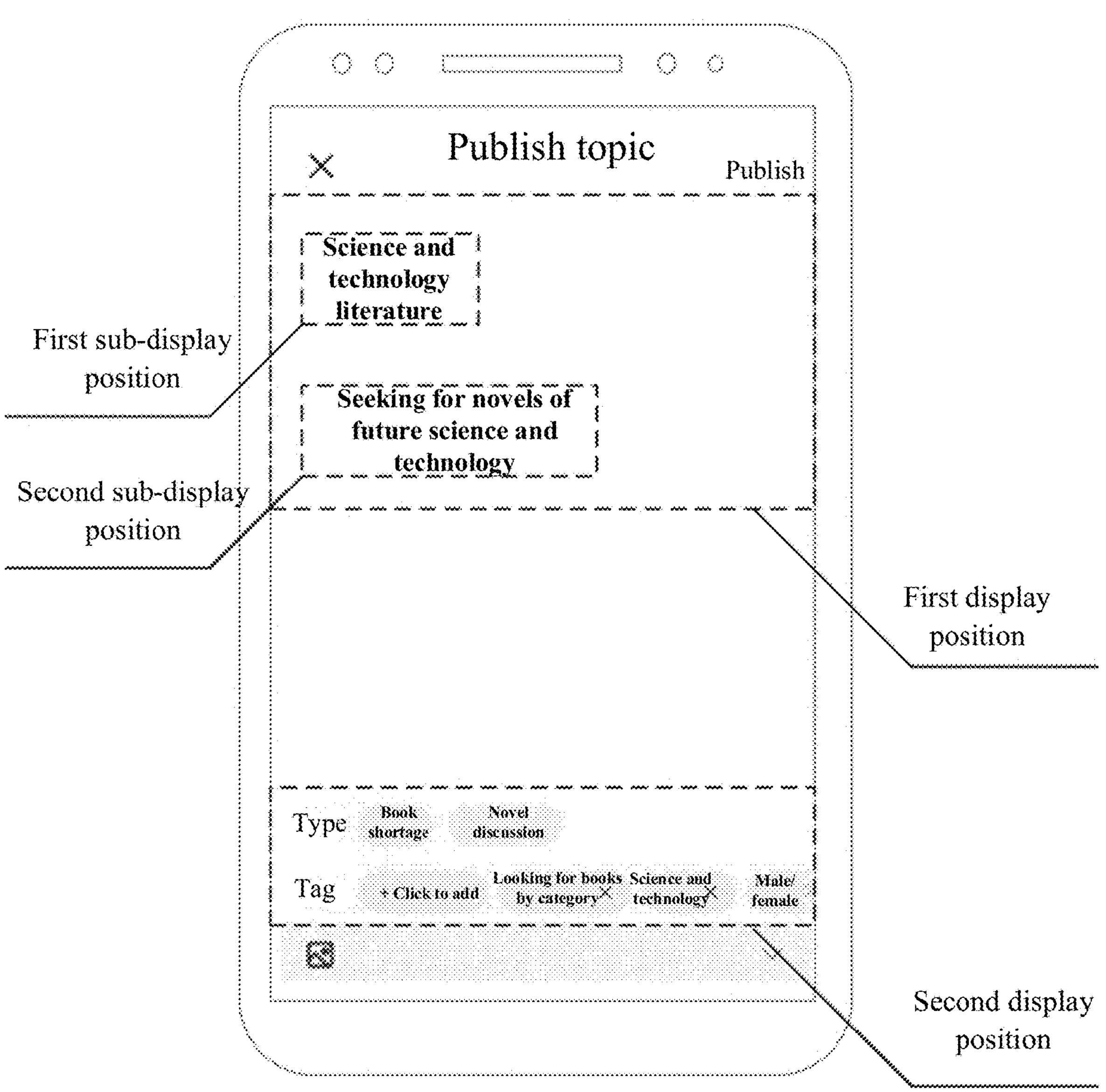
FIG. 5 is a diagram of a topic text operation page provided by an embodiment of the disclosure.

In the embodiment of the disclosure, the topic text operation page is shown in FIG. 5, in which the user is publishing a post on a posting page of the aforementioned reading software. The user can input the target data on this operation page.

In S403, target data input by a user on the operation page are received, the target data include a topic text to be published or topic tags of interest.

Assuming that the target data are the topic text to be published, then the user can input the topic text to be published in the interface as shown in FIG. 5. After that, the terminal device can send the topic text to be published to the server, and the server can determine a topic tag matching with the topic text to be published according to the text classification method described in the above embodiments, and display the topic tag at a second display position as shown in FIG. 5.

In S405, a filtering result determined by a server based on the target data is acquired, the filtering result is obtained through the server filtering the data to be filtered, that is determined based on the target data, by using the text classification method described in any of the above embodiments.

In the embodiment of the disclosure, the filtering results returned by the server are different for different types of target data.

For example, if the target data are the topic text to be published, the server can determine a topic tag matching with the topic text to be published according to the text classification method described in the above embodiments. If the target data are topic tags of interest, the server can determine a published topic text matching with the topic tags of interest according to the text classification method described in the above embodiments.

In S407, the target data and/or the filtering result of the target data is displayed on the operation page.

In the embodiment of the disclosure, in a case where the target data are topic tags of interest, the filtering result of the target data may be a published topic text matching with the topic tags of interest. For example, when the target data are “science and technology”, the target data and recommended topics about books or articles related to the topic tags of interest can be displayed on the operation page. Here, the recommended topic can be a published topic text for recommending books or articles.

Topic tags of a book recommendation topic can be determined more accurately by means of the above processing method, and the accuracy of classification for the book recommendation topic can be improved, so as to provide users with more accurate book recommendations, thereby improving their reading experience.

In an alternative implementation, the target data include the topic text to be published; and the displaying the target data and/or the filtering result of the target data on the operation page specifically includes: (1) displaying the topic text to be published at a first display position of the operation page; and (2) displaying a publishing type of the topic text to be published and/or at least one target topic tag matching with the topic text to be published at a second display position of the operation page.

In the embodiment of the disclosure, as shown in FIG. 5, the first display position is used to display the topic text to be published input by the user, a first sub-display position in the first display position is used to display a text title of the topic text to be published; and a second sub-display position in the first display position is used to display a text content of the topic text to be published.

In addition, as shown in FIG. 5, the second display area includes at least one target topic tag matching with the topic text to be published.

From the above description, it can be seen that different contents of the target data can be displayed at the first display position and the second display position respectively, resulting in a more visually appealing and user-friendly layout of the operation interface and ultimately improving the user experience.

In an alternative implementation, based on the embodiment shown in FIG. 4, the method further includes: detecting a trigger operation of the user on a tag modification identifier of the target topic tag displayed on the operation page, performing a modification operation matching with the tag modification identifier triggered by the user on the target topic tag, and displaying a modified target topic tag on the operation page, the modification operation includes at least one of the following: adding, deleting and modifying.

In the embodiment of the disclosure, as shown in FIG. 5, the user can also modify the target topic tag through a tag modification identifier. Specifically, after detecting a trigger operation by the user on a “+click to add” button (i.e., the tag modification identifier), it can be determined that a modification operation matching with the “+click to add” button is an adding operation, and in response to the adding operation, a corresponding new topic tag is added at the second display position.

In addition, as shown in FIG. 5, each target topic tag also includes an “X” tag modification identifier. After detecting a trigger operation by the user on the “X” tag modification identifier, it can be determined that a modification operation matching with the “X” tag modification identifier is a deleting operation, and in response to the deleting operation, the corresponding target topic tag is deleted.

In addition, the user can also directly modify the tag content in the target topic tag by triggering the target topic tag at the second display position. For example, after detecting a trigger operation by the user on the “science and technology” target topic tag, a modified content created by the user regarding the “science and technology” target topic is acquired, and once a topic tag in a tag library matches with the modified content, the topic tag corresponding to the modified content is determined as the target topic tag.

From the above description, it can be seen that the target topic tag can be modified through the modification operation, which makes the user more flexible and convenient when adding the target topic tag, and improves the user experience.

In an alternative implementation, under the condition that the target data include the topic tags of interest, the method further includes: (1) detecting whether a tag quantity of the topic tags of interest exceeds a preset number after receiving the topic tags of interest input by the user on the operation page; and (2) displaying a prompt message when the tag quantity exceeds the preset number, the prompt message being used to indicate that the quantity of the topic tags of interest has reached the preset number.

Figure 6:
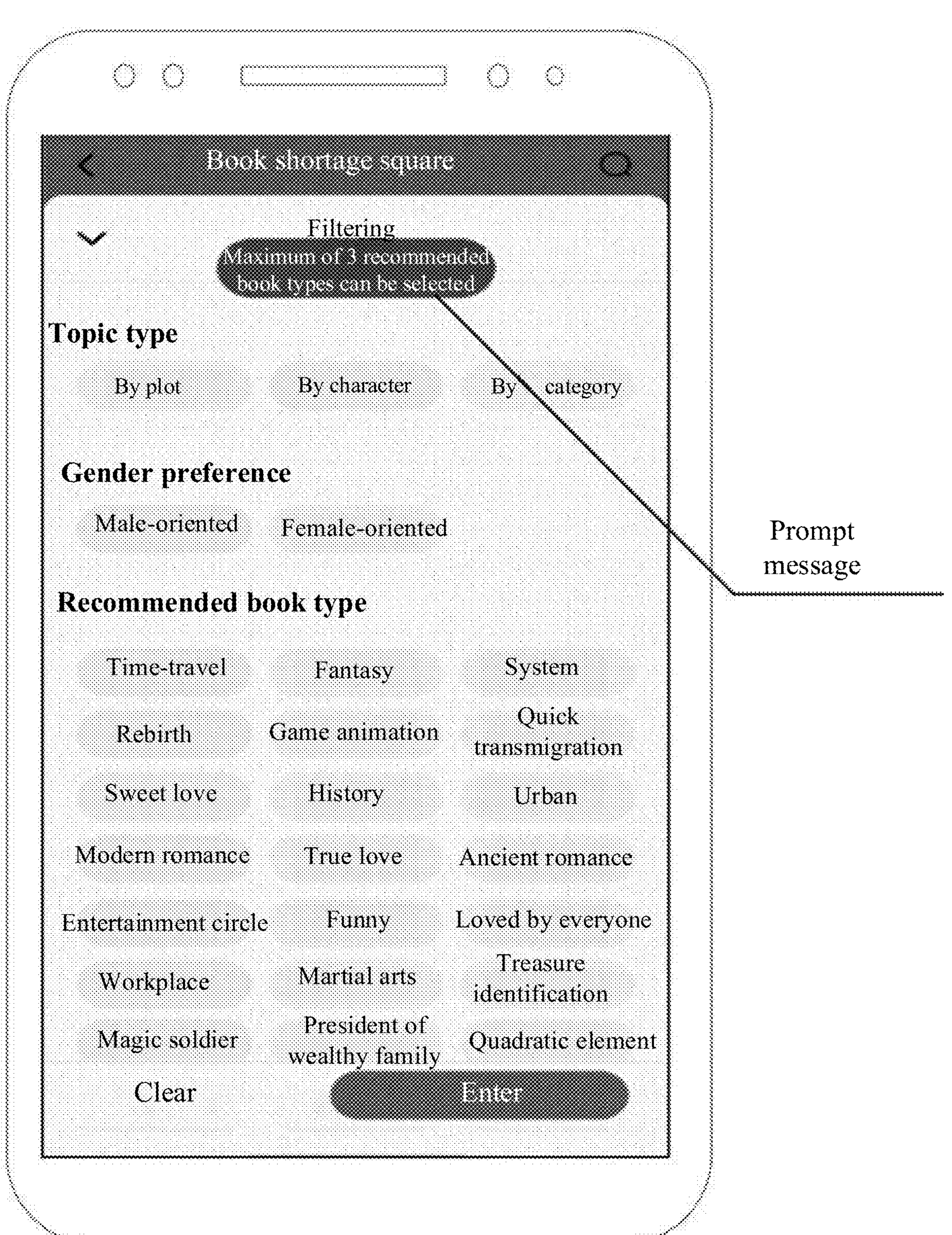
FIG. 6 is a diagram of a candidate topic tag page provided by an embodiment of the disclosure.

In the embodiment of the disclosure, after the target topic tag adding operation is detected, a candidate topic tag page as shown in FIG. 6 can be displayed on a display interface, and the user can determine the topic tags of interest by selecting candidate topic tags in the candidate topic tag page.

In addition, when the user selects the topic tags of interest, whether the quantity of the topic tags of interest selected by the user exceeds a preset number can be detected, and a prompt message is displayed when the tag quantity exceeds the preset number. The prompt message is used to indicate that the quantity of the topic tags of interest has reached the preset number.

In the embodiment of the disclosure, the tags of interest may correspond to different category dimensions. As shown in FIG. 6, the category dimensions corresponding to the tags of interest include topic type, gender preference, and recommended book type.

Therefore, the preset number can be set for the tags of interest in all category dimensions, and can also be set for the tags of interest in at least some category dimensions. Here, it is assumed that the preset number is set for the category dimension of “recommended book type”. Specifically, if the preset number is 3, when it is detected that the user has selected more than 3 tags of interest under the category dimension of “recommended book type”, a prompt message "Maximum of 3 recommended book types can be selected" is displayed on the display interface, as shown in FIG. 6.

From the above description, it can be seen that the quantity of the tags of interest selected by the user can be limited by the preset number, thus avoiding the reduction of filtering efficiency caused by an excessive number of tags of interest and improving the user experience.

In an alternative implementation, under the condition that the target data include the topic tags of interest, the displaying a topic text operation page specifically includes: (1) acquiring a preset topic tag belonging to at least one target topic category in response to a topic filtering request of the user; and (2) determining a category display area of each target topic category on the operation page, and displaying a corresponding target topic category and a preset topic tag belonging to the target topic category in the category display area.

In the embodiment of the disclosure, as shown in FIG. 6, the target topic categories are divided into "topic type", "gender preference" and "recommended book type".

In the embodiment of the disclosure, after determining the preset topic tag belonging to at least one target topic category, the category display area of each target topic category can be determined on the operation page. For example, the category display area of "topic type", the category display area of "gender preference" and the category display area of "recommended book type" are determined.

After determining the corresponding category display area, the corresponding target topic category and the preset topic tag belonging to the target topic category can be displayed in the category display area.

For example, for the target topic category "topic type", the preset topic tags belonging to this category can include "by plot", "by character" and "by category". For example, for the target topic category "gender preference", the preset topic tags belonging to this category can include "male-oriented" and "female-oriented".

From the above description, it can be seen that the corresponding preset topic tags can be determined according to the target topic categories and displayed through the category display area corresponding to each target topic category, thus improving the efficiency of determining the target topic tags, enhancing the visual appeal of the interface layout and improving the browsing experience of users.

In an alternative implementation, under the condition that the target data include the topic tags of interest, the displaying the target data and/or the filtering result of the target data on the operation page specifically includes: (1) displaying the topic tags of interest in a title display area of the operation page; and (2) displaying a key topic content of a published topic text matching with each topic tag of interest in a text display area of the operation page.

Figure 7:
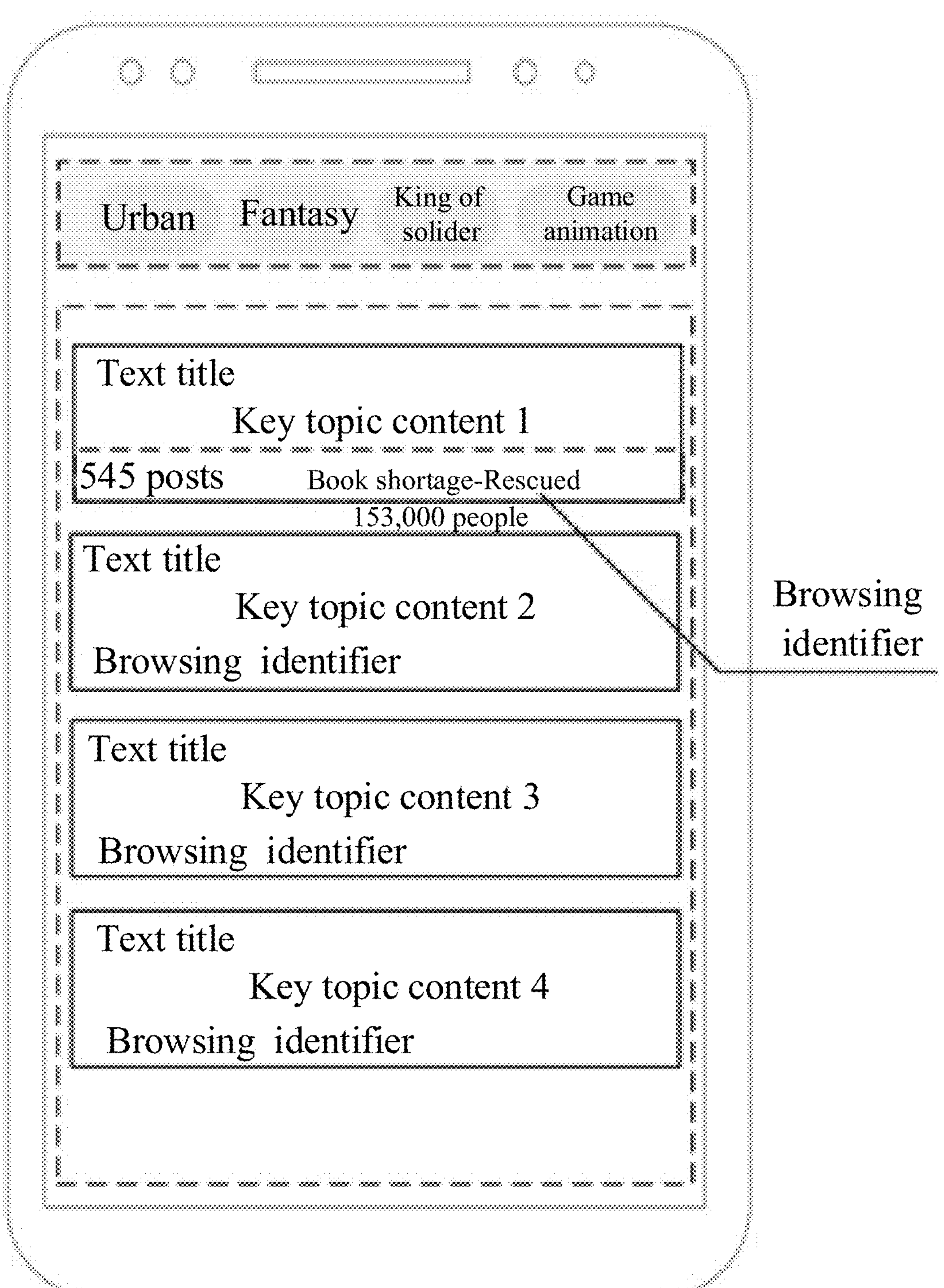
FIG. 7 is a diagram of a display page when displaying target data provided by an embodiment of the disclosure.

In the embodiment of the disclosure, a target data display page is shown in FIG. 7. Here, the display page includes the title display area and the text display area, the title display area is used to display the topic tags of interest, and the text display area is used to display the key topic content of the published topic text matching with each topic tag of interest.

Specifically, the key topic content can include a text title of the published topic text and a browsing identifier, the browsing identifier is used to indicate the number of views of the published topic text and the number of book recommendations adopted (the number of book recommendations adopted can be in the form of "Book shortage-rescued 153,000 people" as shown in FIG. 7).

From the above description, it can be seen that the topic tags of interest and the key topic content of the published topic text can be displayed through the tag display area and the text display area respectively, which makes the page layout more reasonable. Moreover, by displaying the key topic content of the published topic text, the published topic text can be refined, which further improves rationality of the page layout, and allows the display interface to present more substantial content simultaneously, making it convenient for users to view.

In an alternative implementation, the method further includes: (1) in response to a selection operation on the topic tags of interest, determining a target topic tag selected by the user, and acquiring a published topic text matching with the target topic tag; and (2) displaying a key topic content of the published topic text matching with the target topic tag in a text display area of a topic filtering page.

In the embodiment of the disclosure, the user can determine the published topic text corresponding to the target topic tag to be viewed by selecting the topic tag of interest. Specifically, after detecting the target topic tag selected by the user, the published topic texts displayed on the topic filtering page can be filtered, so as to determine the published topic text matching with the target topic text, and the key topic content of the published topic text matching with the target topic text can be displayed in the text display area.

From the above description, it can be seen that the key topic contents of the published topic texts displayed on the topic filtering page can be filtered through the topic tags of interest, so as to better meet the needs of users and improve the user experience.

To sum up, in the embodiments of the disclosure, the target topic tag is determined from the topic tags to be predicted by determining the tag correlation between the tag description feature and the target text feature, so that the corresponding topic tag can be more accurately determined for the topic text to be classified, thereby improving the accuracy of topic classification for the topic text to be classified. Under the condition that the topic text to be classified is a book recommendation topic, a topic tag of the book recommendation topic can be determined more accurately by means of the above processing method, and the accuracy of classification for the book recommendation topic can be improved, so as to provide users with more accurate book recommendations, thereby improving their reading experience.

It can be understood by those skilled in the art that in the above-mentioned method according to specific implementations, the order of writing the steps does not necessarily imply a strict execution sequence or impose any limitations on the implementation process. The specific execution sequence of each step should be determined based on its functionality and possible inherent logic.

Based on the same inventive concept, an embodiment of the disclosure further provides a text classification apparatus corresponding to the text classification method. Because the principle of solving problems by the apparatus in the embodiment of the disclosure is similar to the above-mentioned text classification method, the implementation of the method can be used as a reference for the implementation of the apparatus, which will not be repeated here.

Figures 8, 9:
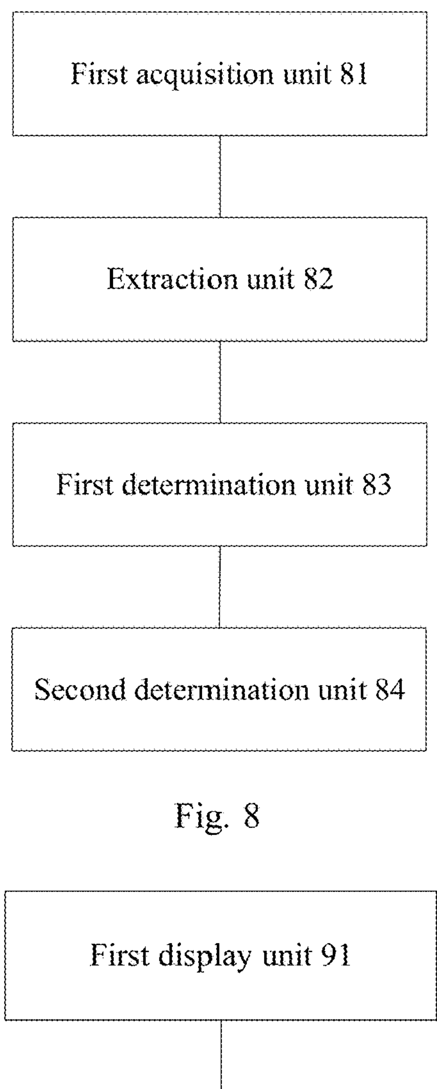
FIG. 8 is a diagram of a text classification apparatus provided by an embodiment of the disclosure.
FIG. 9 is a diagram of a text processing apparatus provided by an embodiment of the disclosure.

Referring to FIG. 8 which is a diagram of a text classification apparatus provided by an embodiment of the disclosure, the apparatus includes a first acquisition unit 81, an extraction unit 82, a first determination unit 83, and a second determination unit 84. Specifically, the first acquisition unit 81 is configured to acquire a topic text to be classified and tag description information of at least one topic tag to be predicted; the extraction unit 82 is configured to extract a target text feature of the topic text to be classified, and extract a tag description feature of the tag description information of each topic tag to be predicted; the first determination unit 83 is configured to determine a tag correlation between the target text feature and each tag description feature to obtain at least one tag correlation; and the second determination unit 84 is configured to determine a target topic tag matching with the topic text to be classified from the at least one topic tag to be predicted based on the at least one tag correlation.

In the embodiments of the disclosure, the target topic tag is determined from the topic tags to be predicted by determining the tag correlation between the tag description feature and the target text feature, so that the corresponding topic tag can be more accurately determined for the topic text to be classified, thereby improving the accuracy of topic classification for the topic text to be classified. Under the condition that the topic text to be classified is a book recommendation topic, a topic tag of the book recommendation topic can be determined more accurately by means of the above processing method, and the accuracy of classification for the book recommendation topic can be improved, so as to provide users with more accurate book recommendations, thereby improving their reading experience.

In a possible implementation, the target text feature includes a plurality of sub-text features, and each sub-text feature corresponds to each first unit text in the topic text to be classified; and the first determination unit 83 is further configured to: determine a correlation coefficient of each first unit text based on the target text feature and the tag description feature, the correlation coefficient being used to represent a tag correlation degree between the first unit text and the corresponding topic tag to be predicted; and perform weighted summation calculation on the sub-text features of respective the first unit texts, and determine the tag correlation according to a calculation result based on the correlation coefficient of each first unit text.

In a possible implementation, the first determination unit 83 is further configured to: determine a first sub-correlation coefficient of each first unit text based on a sub-text feature of the first unit text; determine a second sub-correlation coefficient based on the target text feature and the tag description feature; and determine the correlation coefficient based on a ratio between the first sub-correlation coefficient and the second sub-correlation coefficient.

In an optional implementation, the first determination unit 83 is further configured to:

determine a first weight of each first unit text based on the sub-text feature of the first unit text and a preset weight matrix; and determine the first sub-correlation coefficient based on the first weight.

In a possible implementation, the tag description feature includes a plurality of second unit texts, and the first determination unit 83 is further configured to:

determine a second weight of each first unit text based on the target text feature and a preset weight matrix; determine a third weight of each second unit text based on the tag description feature and the preset weight matrix; and determine the second sub-correlation coefficient based on the second weight and the third weight.

In a possible implementation, the first acquisition unit 81 is further configured to: acquire original text data to be processed, and determine a text type identifier contained in the original text data; and determine a data partitioning position of the original text data based on the text type identifier, and partition the original text data based on the data partitioning position to obtain the topic text to be classified and the tag description information.

In a possible implementation, the extraction unit 82 is further configured to:

determine a target vector of each first unit text in the topic text to be classified, elements in the target vector being used for indicating a mapping relationship between the first unit text and each preset unit text; and extract a key feature vector of the topic text to be classified from the target vectors of all the first unit texts in the topic text to be classified, and determine the key feature vector as the target text feature.

In a possible implementation, the topic text to be classified includes at least one of the following: topic title text, topic abstract text, and topic tag description text.

In a possible implementation, the extracting a target text feature of the topic text to be classified, and the extracting a tag description feature of the tag description information of each topic tag to be predicted, include: extracting the target text feature of the topic text to be classified through a feature extraction layer in a text classification model, and extracting the tag description feature of the tag description information of each topic tag to be predicted; the determining a tag correlation between the target text feature and each tag description feature to obtain at least one tag correlation includes: determining the tag correlation between the target text feature and each tag description feature through a correlation determination layer in the text classification model to obtain the at least one tag correlation; and the determining a target topic tag matching with the topic text to be classified from the at least one topic tag to be predicted based on the at least one tag correlation includes: determining the target topic tag matching with the topic text to be classified from the at least one topic tag to be predicted based on the at least one tag correlation through a classification layer in the text classification model.

In a possible implementation, the apparatus is further configured to: determine a plurality of training samples, each training sample including a topic tag to be predicted and a topic text to be trained, each training sample including a matching tag, and the matching tag being used for indicating a matching degree between the topic tag to be predicted and the topic text to be trained; and train a text classification model to be trained through the plurality of training samples to obtain the text classification model.

In a possible implementation, the apparatus is further configured to: determine a first tag quantity of the topic tags to be predicted contained in the plurality of training samples, and determine a second tag quantity of target classification tags matching with the topic text to be trained in the topic tags to be predicted; determine a target loss function value of the text classification model to be trained based on the first tag quantity, the second tag quantity, the matching tags and prediction results of the text classification model to be trained on the plurality of training samples; and adjust model parameters of the text classification model to be trained according to the target loss function value to obtain the text classification model.

Referring to FIG. 9 which is a diagram of a text processing apparatus provided by an embodiment of the disclosure, the apparatus includes a first display unit 91, a receiving unit 92, a second acquisition unit 93, and a second display unit 94. Specifically, the first display unit 91 is configured to display a topic text operation page; the receiving unit 92 is configured to receive target data input by a user on the operation page, the target data including a topic text to be published or topic tags of interest; the second acquisition unit 93 is configured to acquire a filtering result determined by a server based on the target data, the filtering result being obtained through the server filtering the data to be filtered, that is determined based on the target data, by using the text classification method described in the above embodiments; and the second display unit 94 is configured to display the target data and/or the filtering result of the target data on the operation page.

Topic tags of a book recommendation topic can be determined more accurately by means of the above processing method, and the accuracy of classification for the book recommendation topic can be improved, so as to provide users with more accurate book recommendations, thereby improving their reading experience.

In a possible implementation, the target data include the topic text to be published; and the second display unit 94 is further configured to: display the topic text to be published at a first display position of the operation page; and display a publishing type of the topic text to be published and/or at least one target topic tag matching with the topic text to be published at a second display position of the operation page.

In a possible implementation, the second display unit 94 is further configured to: detect a trigger operation of the user on a tag modification identifier of the target topic tag displayed on the operation page, perform a modification operation matching with the tag modification identifier triggered by the user on the target topic tag, and display a modified target topic tag on the operation page, the modification operation includes at least one of the following: adding, deleting and modifying.

In a possible implementation, the target data include the topic tags of interest, and the apparatus is further configured to: detect whether a tag quantity of the topic tags of interest exceeds a preset number after receiving the topic tags of interest input by the user on the operation page; and display a prompt message when the tag quantity exceeds the preset number, the prompt message being used to indicate that the quantity of the topic tags of interest has reached the preset number.

In a possible implementation, the target data include the topic tags of interest; and the first display unit 91 is further configured to: acquire a preset topic tag belonging to at least one target topic category in response to a topic filtering request of the user; and determine a category display area of each target topic category on the operation page, and display a corresponding target topic category and a preset topic tag belonging to the target topic category in the category display area.

In a possible implementation, the target data include the topic tags of interest; and the second display unit 94 is further configured to: display the topic tags of interest in a title display area of the operation page; and display a key topic content of a published topic text matching with each topic tag of interest in a text display area of the operation page.

In a possible implementation, the second display unit 94 is further configured to: determine a target topic tag selected by the user, and acquire a published topic text matching with the target topic tag in response to a selection operation on the topic tags of interest; and display a key topic content of the published topic text matching with the target topic tag in a text display area of a topic filtering page.

For the process flow of each unit in the apparatus and the interactive process between units, please refer to the relevant description in the above method embodiment, which will not be repeated here.

Figure 10:
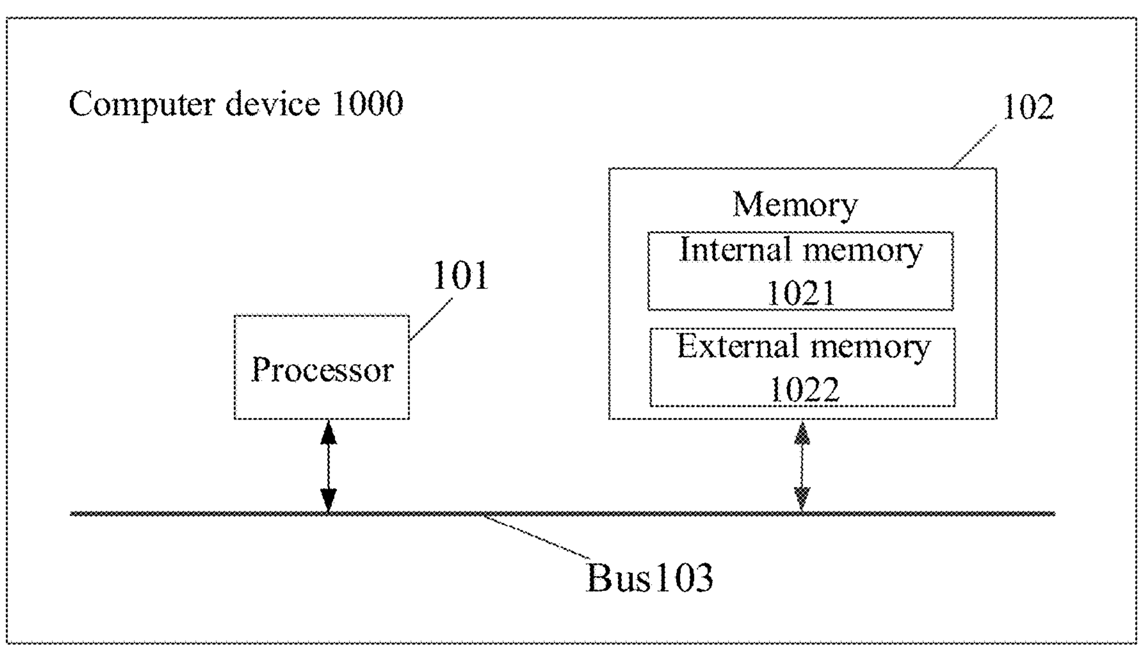
FIG. 10 is a diagram of a computer device provided by an embodiment of the disclosure.

Corresponding to the text classification method shown in FIG. 1, an embodiment of the disclosure further provides another computer device 1000. Referring to FIG. 10 which is a structural diagram of the computer device 1000 provided by an embodiment of the disclosure, the computer device includes: a processor 101, a memory 102, and a bus 103. The memory 102 is used to store execution instructions, includes an internal memory 1021 and the external memory 1022. Here, the internal memory 1021, also called internal storage, is used for temporarily storing operation data in the processor 101 and data exchanged with the external memory 1022 such as a hard disk. The processor 101 exchanges data with the external memory 1022 through the internal memory 1021. When the computer device 1000 runs, the processor 101 communicates with the memory 102 through the bus 103, so that the processor 101 executes the following instructions: acquiring a topic text to be classified and tag description information of at least one topic tag to be predicted; extracting a target text feature of the topic text to be classified, and extracting a tag description feature of the tag description information of each topic tag to be predicted; determining a tag correlation between the target text feature and each tag description feature to obtain at least one tag correlation; and determining a target topic tag matching with the topic text to be classified from the at least one topic tag to be predicted based on the at least one tag correlation.

Figure 11:
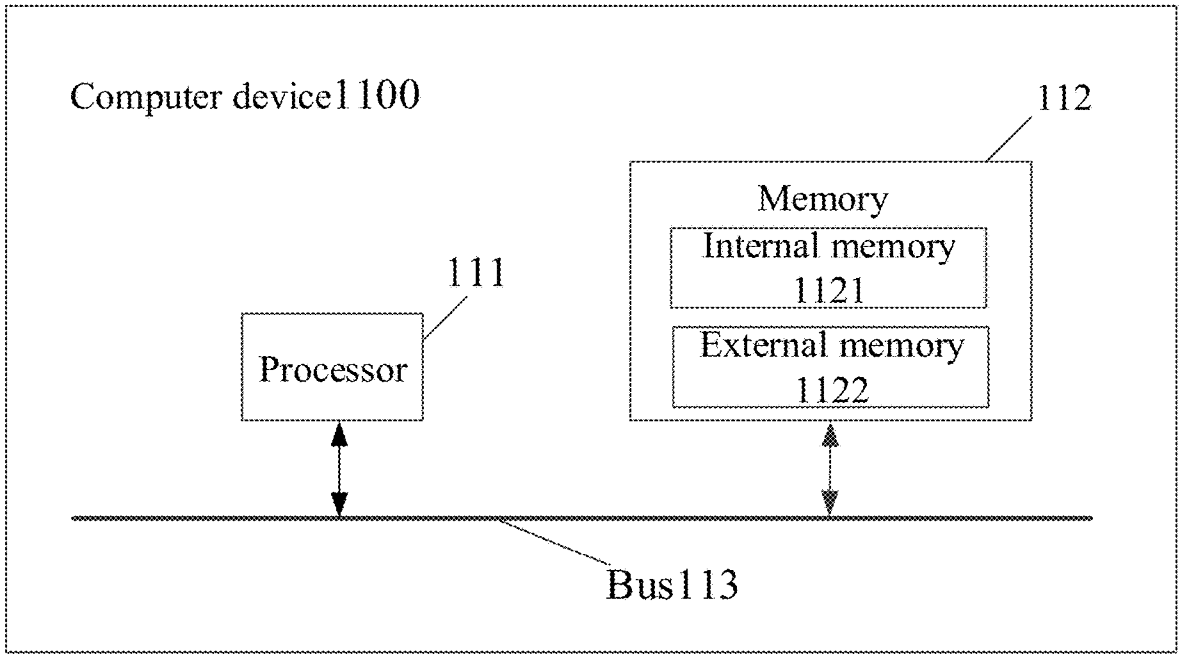
FIG. 11 is a diagram of another computer device provided by an embodiment of the disclosure.

Corresponding to the text processing method shown in FIG. 1, an embodiment of the disclosure further provides a computer device 1100. Referring to FIG. 11 which is a structural diagram of the computer device 1100 provided by an embodiment of the disclosure, the computer device includes: a processor 111, a memory 112, and a bus 113. The memory 112 is used to store execution instructions, includes an internal memory 1121 and the external memory 1122. Here, the internal memory 1121, also called internal storage, is used for temporarily storing operation data in the processor 111 and data exchanged with the external memory 1122 such as a hard disk. The processor 111 exchanges data with the external memory 1122 through the internal memory 1121. When the computer device 1100 runs, the processor 111 communicates with the memory 112 through the bus 113, so that the processor 111 executes the following instructions: displaying a topic text operation page; receiving target data input by a user on the operation page, the target data including a topic text to be published or topic tags of interest; acquiring a filtering result determined by a server based on the target data, the filtering result being obtained through the server filtering the data to be filtered, that is determined based on the target data, by using the text classification method described in the above embodiments; and displaying the target data and/or the filtering result of the target data on the operation page.

An embodiment of the disclosure further provides a computer-readable storage medium, on which a computer program is stored, and the computer program, when executed by a processor, cause the processor to perform the steps of the text classification method and/or the text processing method described in the above method embodiments. The storage medium can be a volatile or nonvolatile computer-readable storage medium.

An embodiment of the disclosure further provides a computer program product, which carries a program code, and the program code includes instructions that can be used to execute the steps of the text classification method and/or the text processing method described in the above method embodiments. For details, please refer to the above-mentioned method embodiment, which is not repeated here.

The above computer program product can be implemented through hardware, software, or their combination. In one alternative embodiment, the computer program product is embodied as a computer storage medium, and in another alternative embodiment, the computer program product is embodied as a software product, such as a Software Development Kit (SDK).

An embodiment of the disclosure further provides a computer program stored in a readable storage medium, at least one processor of an electronic device can read the computer program from the readable storage medium, and the at least one processor executes the computer program to enable the electronic device to execute the steps of the text classification method and the text processing method described in the above method embodiments. For details, please refer to the above method embodiments, which will not be repeated here.

It can be clearly understood by those skilled in the art that for the convenience and conciseness of description, to understand the specific working process of the system and apparatus described above, one can refer to the corresponding process in the aforementioned method embodiment, which will not be repeated here. In several embodiments provided by this disclosure, it should be understood that the disclosed system, apparatus and method can be realized in other ways. The apparatus embodiment described above is only schematic. For example, the division of the units is only a logical function division, and there may be other division methods in actual implementation. For another example, multiple units or components may be combined or integrated into another system, or some features may be ignored or not implemented. Furthermore, the displayed or discussed coupling or direct coupling or communication can be indirect coupling or communication through some communication interfaces, apparatuses, or units, which can be electrical, mechanical, or in other forms.

The units described as separate components may or may not be physically separated, and the components displayed as units may or may not be physical units, i.e., may be located in one place or may be distributed over plurality of network units. Some or all of the units can be selected according to actual needs to achieve the purpose of this embodiment.

In addition, all functional units in each embodiment of the disclosure may be integrated into one processing unit, or exist physically separated, or two or more units may be integrated into one unit.

If the functions are realized in the form of software functional units and sold or used as independent products, they can be stored in a processor-executable nonvolatile computer-readable storage medium. Based on this understanding, the essence of the technical scheme of the disclosure, or the part that contributes to the prior art, or part of this technical scheme, can be embodied in the form of a software product, which is stored in a storage medium and includes several instructions to cause a computer device (which can be a personal computer, a server, a network device, etc.) execute all or part of the steps of the method described in various embodiments of the disclosure. The aforementioned storage media include: USB flash disk, mobile hard disk, read-only memory (ROM), random access memory (RAM), magnetic disk or optical disk and other media that can store program codes.

Finally, it should be noted that the above-mentioned embodiments are only specific implementations of the disclosure, which are used to illustrate the technical scheme of the disclosure, but not to limit it. The protection scope of the disclosure is not limited to these embodiments. Although the disclosure has been described in detail with reference to the above-mentioned embodiments, it should be understood by those of ordinary skill in the art that any technician familiar with the technical field can still modify or easily think of changes to the technical scheme recorded in the above-mentioned embodiments within the technical scope of the disclosure, or equivalently replace certain technical features described in the aforementioned embodiments. These modifications, changes or substitutions do not make the essence of the corresponding technical scheme deviate from the spirit and scope of the technical scheme of the embodiments of this disclosure, and should be included in the protection scope of this disclosure. Therefore, the scope of protection of this disclosure should be based on the scope of protection of the claims.

What is claimed is:

1. A text classification method which is applied to a server, comprising:

acquiring a topic text to be classified and tag description information of at least one topic tag to be predicted;

extracting a first text feature of the topic text to be classified, and extracting a tag description feature of the tag description information of each topic tag to be predicted;

determining a tag correlation between the first text feature and each tag description feature to obtain at least one tag correlation; and determining a first topic tag matching with the topic text to be classified from the at least one topic tag to be predicted based on the at least one tag correlation;

wherein the acquiring a topic text to be classified and tag description information of at least one topic tag to be predicted comprises:

acquiring original text data to be processed, and determining a text type identifier contained in the original text data; and determining a data partitioning position of the original text data based on the text type identifier, and partitioning the original text data based on the data partitioning position to obtain the topic text to be classified and the tag description information, wherein, the extracting a first text feature of the topic text to be classified, and the extracting a tag description feature of the tag description information of each topic tag to be predicted comprise: extracting the first text feature of the topic text to be classified through a feature extraction layer in a text classification model, and extracting the tag description feature of the tag description information of each topic tag to be predicted, wherein the text classification model is part of a neural network;

the determining a tag correlation between the first text feature and each tag description feature to obtain at least one tag correlation comprises: determining the tag correlation between the first text feature and each tag description feature through a correlation determination layer in the text classification model to obtain the at least one tag correlation; and the determining a first topic tag matching with the topic text to be classified from the at least one topic tag to be predicted based on the at least one tag correlation comprises: determining the first topic tag matching with the topic text to be classified from the at least one topic tag to be predicted based on the at least one tag correlation through a classification layer in the text classification model.

2. The method according to claim 1, wherein the first text feature includes a plurality of sub-text features, and each of the plurality of sub-text features corresponds to each first unit text in the topic text to be classified; and the determining the tag correlation between the first text feature and each tag description feature comprises:

determining a correlation coefficient of each first unit text based on the first text feature and the tag description feature, the correlation coefficient being used to represent a tag correlation degree between the first unit text and the corresponding topic tag to be predicted; and based on the correlation coefficient of each first unit text, performing weighted summation calculation on the sub-text features of respective first unit texts, and determining the tag correlation according to a calculation result.

3. The method according to claim 2, wherein the determining a correlation coefficient of each first unit text based on the first text feature and the tag description feature comprises:

determining a first sub-correlation coefficient of each first unit text based on a sub-text feature of each of the first unit texts;

determining a second sub-correlation coefficient based on the first text feature and the tag description feature; and determining the correlation coefficient based on a ratio between the first sub-correlation coefficient and the second sub-correlation coefficient.

4. The method according to claim 3, wherein the determining a first sub-correlation coefficient of each first unit text based on a sub-text feature of each of the first unit texts comprises:

determining a first weight of each first unit text based on the sub-text feature of each of the first unit texts and a preset weight matrix; and determining the first sub-correlation coefficient based on the first weight.

5. The method according to claim 3, wherein the tag description feature includes a plurality of second unit texts; and the determining a second sub-correlation coefficient based on the first text feature and the tag description feature comprises:

determining a second weight of each first unit text based on the first text feature and a preset weight matrix;

determining a third weight of each second unit text based on the tag description feature and the preset weight matrix; and determining the second sub-correlation coefficient based on the second weight and the third weight.

6. The method according to claim 2, wherein the extracting a first text feature of the topic text to be classified comprises:

determining a first vector of each first unit text in the topic text to be classified, elements in the first vector being used for indicating a mapping relationship between the first unit text and each preset unit text; and extracting a key feature vector of the topic text to be classified from first vectors of all the first unit texts in the topic text to be classified, and determining the key feature vector as the first text feature.

7. The method according to claim 1, further comprising:

determining a plurality of training samples, each of the plurality of training samples including the topic tag to be predicted and a topic text to be trained, each of the plurality of training samples including a matching tag, and the matching tag being used for indicating a matching degree between the topic tag to be predicted and the topic text to be trained; and training a text classification model to be trained through the plurality of training samples to obtain the text classification model.

8. The method according to claim 7, wherein the training a text classification model to be trained through the plurality of training samples to obtain the text classification model comprises:

determining a first tag quantity of the topic tags to be predicted contained in the plurality of training samples, and determining a second tag quantity of first classification tags matching with the topic text to be trained in the topic tags to be predicted;

determining a first loss function value of the text classification model to be trained based on the first tag quantity, the second tag quantity, the matching tag, and prediction results of the text classification model to be trained on the plurality of training samples; and adjusting model parameters of the text classification model to be trained according to the first loss function value to obtain the text classification model.

9. A text processing method which is applied to a terminal device, comprising:

displaying a topic text operation page;

receiving first data input by a user on the operation page, the first data comprising a topic text to be published or topic tags of interest;

acquiring a filtering result determined by a server based on the first data, the filtering result being obtained through the server filtering the data to be filtered, that is determined based on the first data, by using the text classification method according to claim 1; and displaying the first data and/or the filtering result of the first data on the operation page.

10. The method according to claim 9, wherein the first data include the topic text to be published; and the displaying the first data and/or the filtering result of the first data on the operation page comprises:

displaying the topic text to be published at a first display position of the operation page; and displaying a publishing type of the topic text to be published and/or at least one first topic tag matching with the topic text to be published at a second display position of the operation page.

11. The method according to claim 10, further comprising:

detecting a trigger operation of the user on a tag modification identifier of the first topic tag displayed on the operation page, performing a modification operation matching with the tag modification identifier triggered by the user on the first topic tag, and displaying a modified first topic tag on the operation page, wherein the modification operation comprises at least one of the following: adding, deleting and modifying.

12. The method according to claim 9, wherein the first data include the topic tags of interest, and the method further comprises:

detecting whether a tag quantity of the topic tags of interest exceeds a preset number after receiving the topic tags of interest input by the user on the operation page; and displaying a prompt message in a case where the tag quantity exceeds the preset number, the prompt message being used to indicate that the quantity of the topic tags of interest has reached the preset number.

13. The method according to claim 9, wherein the first data include the topic tags of interest, and the displaying a topic text operation page comprises:

acquiring a preset topic tag belonging to at least one first topic category in response to a topic filtering request of the user; and determining a category display area of each first topic category on the operation page, and displaying a corresponding first topic category and the preset topic tag belonging to the first topic category in the category display area.

14. The method according to claim 9, wherein the first data include the topic tags of interest; and the displaying the first data and/or the filtering result of the first data on the operation page comprises:

displaying the topic tags of interest in a title display area of the operation page; and displaying a key topic content of a published topic text matching with each topic tag of interest in a text display area of the operation page.

15. The method according to claim 14, further comprising:

determining a first topic tag selected by the user, and acquiring a published topic text matching with the first topic tag in response to a selection operation on the topic tags of interest; and displaying a key topic content of the published topic text matching with the first topic tag in a text display area of a topic filtering page.

16. A text classification apparatus which is applied to a server, comprising:

a first acquisition unit configured to acquire a topic text to be classified and tag description information of at least one topic tag to be predicted;

an extraction unit configured to extract a first text feature of the topic text to be classified and extract a tag description feature of the tag description information of each topic tag to be predicted;

a first determination unit configured to determine a tag correlation between the first text feature and each tag description feature to obtain at least one tag correlation; and a second determination unit configured to determine a first topic tag matching with the topic text to be classified from the at least one topic tag to be predicted based on the at least one tag correlation;

wherein the first acquisition unit is further configured to:

acquire original text data to be processed, and determine a text type identifier contained in the original text data; and determine a data partitioning position of the original text data based on the text type identifier, and partition the original text data based on the data partitioning position to obtain the topic text to be classified and the tag description information, wherein, the extracting a first text feature of the topic text to be classified, and the extracting a tag description feature of the tag description information of each topic tag to be predicted comprise: extracting the first text feature of the topic text to be classified through a feature extraction layer in a text classification model, and extracting the tag description feature of the tag description information of each topic tag to be predicted, wherein the text classification model is part of a neural network;

the determining a tag correlation between the first text feature and each tag description feature to obtain at least one tag correlation comprises: determining the tag correlation between the first text feature and each tag description feature through a correlation determination layer in the text classification model to obtain the at least one tag correlation; and the determining a first topic tag matching with the topic text to be classified from the at least one topic tag to be predicted based on the at least one tag correlation comprises:

determining the first topic tag matching with the topic text to be classified from the at least one topic tag to be predicted based on the at least one tag correlation through a classification layer in the text classification model.

17. A text processing apparatus which is applied to a terminal device, comprising:

a first display unit configured to display a topic text operation page;

a receiving unit configured to receive first data input by a user on the operation page, the first data comprising a topic text to be published or topic tags of interest;

a second acquisition unit configured to acquire a filtering result determined by a server based on the first data, the filtering result being obtained through the server filtering the data to be filtered, that is determined based on the first data, by using the text classification method according to claim 1; and a second display unit configured to display the first data and/or the filtering result of the first data on the operation page.

18. A computer device, comprising a processor, a memory and a bus, wherein the memory stores machine-readable instructions executable by the processor; when the computer device runs, the processor communicates with the memory through the bus; and the machine-readable instructions, when executed by the processor, cause the processor to perform the steps of the text classification method according to claim 1.

* * * * *